(12) United States Patent
Newman

(10) Patent No.: US 10,999,483 B2
(45) Date of Patent: May 4, 2021

(54) DISPLAY-BASED CAMERA APPARATUS AND METHODS

(71) Applicant: GoPro, Inc., San Mateo, CA (US)

(72) Inventor: David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/431,622

(22) Filed: Jun. 4, 2019

(65) Prior Publication Data

US 2020/0389576 A1  Dec. 10, 2020

(51) Int. Cl.
| | |
|---|---|
| *H04N 5/225* | (2006.01) |
| *G06T 7/80* | (2017.01) |
| *H04N 9/04* | (2006.01) |
| *G06T 5/50* | (2006.01) |
| *H04N 5/235* | (2006.01) |
| *H04N 5/243* | (2006.01) |

(52) U.S. Cl.
CPC ............ *H04N 5/2258* (2013.01); *G06T 5/50* (2013.01); *G06T 7/80* (2017.01); *H04N 5/2257* (2013.01); *H04N 5/22541* (2018.08); *H04N 5/2351* (2013.01); *H04N 5/243* (2013.01); *H04N 9/04515* (2018.08); *G06T 2207/10052* (2013.01); *G06T 2207/20224* (2013.01)

(58) Field of Classification Search
CPC ............ H04N 5/2258; H04N 5/22541; H04N 9/04515; H04N 5/243; H04N 5/2351; H04N 5/2257; H04N 5/357; H04N 5/217; H04N 9/07; G06T 5/50; G06T 7/80; G06T 2207/10052; G06T 2207/20224
See application file for complete search history.

(56) References Cited

U.S. PATENT DOCUMENTS

| | | | |
|---|---|---|---|
| 7,196,728 B2* | 3/2007 | Campbell | H04N 7/144 348/340 |
| 9,036,070 B2* | 5/2015 | Thorn | H04N 5/2354 348/333.12 |
| 2008/0165267 A1* | 7/2008 | Cok | H04N 7/144 348/333.01 |
| 2010/0066800 A1* | 3/2010 | Ryf | H04N 7/144 348/14.01 |
| 2012/0206582 A1* | 8/2012 | DiCarlo | A61B 1/0005 348/71 |
| 2019/0260963 A1* | 8/2019 | Guo | H04N 5/22541 |

* cited by examiner

*Primary Examiner* — Luong T Nguyen
(74) *Attorney, Agent, or Firm* — Esplin & Associates, PC

(57) ABSTRACT

Apparatus and methods for a light-field camera and display system. In one embodiment, a light-field camera and display apparatus is provided, which may include a display screen and photosensor layer. In one variant, the display screen includes a plurality of pinholes or microlenses and a plurality of pixels configured according to a certain configuration. Additionally, in one variant, the photosensor layer includes multiple arrays of photosensors implemented to capture light that travels through the pinholes or microlenses. Yet additionally, methods for operating and calibrating the light-field camera and display apparatus are provided. In one embodiment, logic is provided which subtracts leakage light from the generated image that is displayed to the user.

19 Claims, 15 Drawing Sheets

DISPLAY-BASED CAMERA APPARATUS AND METHODS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to capturing, processing and/or presenting image data and/or video content, and more particularly, in one exemplary aspect, to a light field camera apparatus and methods for manufacture and use thereof.

Description of Related Art

While the display area of screens in electronic devices (such as smartphones and tablets) have become increasing large due to, e.g., slim bezels, the optimal size is ideally 100%. However, most electronic devices do not achieve such an optimal display size. For example, most current electronic devices have a salient "black notch" across at least a portion of the top of the display screen in order to house a single front-facing (i.e., toward the user) camera. The positioning of the camera in such a design not only decreases the size of the screen, but also introduces parallax—i.e., a user is not looking into the camera while looking at the object displayed on the screen, and hence appears to be looking down (or up if inverted). Moreover, depending on orientation, the image of the user captured by such camera may be less than flattering due to such parallax.

Additionally, conventional (e.g., CMOS-based) cameras used in current electronic devices are limited in various aspects, as they record light intensity only. Some of those limitations include depth of field and view, which can might frustrate user experience especially with respect to certain form factors of electronic devices such as smartphones and tablets. For example, if an object (such as a finger) is covering a portion of the screen where the conventional camera is disposed, that object will obstruct at least a portion of the captured/displayed image.

Yet further, some "single lens" cameras may lack certain desirable attributes regarding mobility and/or perspective for the user, including of the type that are often found in full-feature cinematic productions (e.g., movement of the camera relative to the subject to give perspective, better effects, etc.).

To these ends, solutions are needed to improve camera and display systems by, e.g., optimizing effective usable area of the display screen, as well as eliminating or at least mitigating parallax associated with the use of cameras in such display systems. Additionally, such improved camera and display systems would ideally not be as limited with respect to depth of field and view as compared to existing systems that utilize conventional cameras.

SUMMARY

The present disclosure satisfies the foregoing needs by providing, inter alia, methods and apparatus for a light-field camera and display apparatus.

In one aspect, a method of forming an image from a plurality of constituent components is disclosed. In one embodiment, the method includes: receiving at least a portion of light at each of a plurality of different sensor arrays within a display device, the light associated with a subject from which the light originates; determining at each of the plurality of sensor arrays at least one of: (i) direction of the respective at least portion of the light, and/or (ii) a chromatic characterization of the respective at least portion of the light; and based at least on the at least one of: (i) direction of the respective at least portion of the light, and/or (ii) a chromatic characterization of the respective at least portion of the light from each of the plurality of different sensor arrays, constructing the image.

In another embodiment, the method includes: capturing a plurality of first image data using respective ones of a plurality of display camera elements; processing the plurality of first image data to generate one or more images; and causing display of the one or more images.

In a further aspect, a display device capable of imaging is disclosed. In one embodiment, the display device includes a plurality of heterogeneous regions (in one variant corresponding to pixels), wherein a first type of region includes one or more active elements (e.g., pixels formed via an OLED or AMOLED type process), and a second type of region includes one or more passive elements such as light-transmissive apertures which may have a lens polynomial associated therewith. The passive elements of the second region include a corresponding number of sensors by which light transmitted via the apertures is aggregated into a low-resolution image or portion of an image. In one implementation, the sensors include a Bayer color array. In another implementation, the sensors include a selective chromatic filter (e.g., to filter out one or more specific wavelengths of light passing through the transmissive apertures.

In another aspect, a display device pixel architecture useful for image data generation is disclosed. In one embodiment, the architecture comprises an array of pixels arranged in row-and-column fashion, with transmissive or "aperture" elements disposed at a plurality of prescribed locations within the array. In one variant the array is configured as an $RGBC_1 \ldots RGBC_1$ (row)$\times RGBC_1 \ldots RGBC_k$ (column) configuration, where j is different than k, In another variant the array is configured as an $RGBC_1 \ldots RGBC_j$ (row)$\times RGBC_1 \ldots RGBC_k$ (column) configuration, where j is different than k and where at least one of j and k skip a prescribed number of iterations (e.g., RGB, RGBC, RGB, RGBC ..., or RGB, RGB, RGB, RGBC, RGB, RGB, RGB, RGBC ... ). In yet another variant the array is configured as an $RGBC_1 \ldots RGBC_j$ (row)$\times RGBC_1 \ldots RGBC_k$ (column) configuration, where j is different than k and where at least one of j and k skip a prescribed element of the standard tri-color pixel configuration at a prescribed frequency (e.g., RGB, RBC, RGB, RGC ..., or RGB, RGB, RGB, RGC, RGB, RGB, RGB, RGC ... ).

In another aspect, a method of processing image data derived from a plurality of sensor arrays is disclosed. In one embodiment, the method includes computationally controlling a depth of field associated with an image formed from a selected subset of the sensor arrays. In one variant, the depth of field can be controlled such that object, components or artifacts outside of the selected depth of view can be computationally substituted or altered without affecting the image components within the depth of view. In another embodiment, the method includes selectively excluding or deleting data associated with one or more of a selected subset of the sensor arrays used to form a composite image.

In another aspect, a method of virtualization of movement of a camera is disclosed. In one embodiment, the method includes utilizing various elements of a virtual light-field camera array selectively to obtain a plurality of different perspectives which allow for computation of a virtually moving image (i.e., as if the "camera" is physically moving relative to the subject when in fact it is not).

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In another aspect, a non-transitory computer readable storage apparatus implementing one or more of the foregoing aspects is disclosed and described. In one embodiment, the computer readable apparatus comprises a program memory, or an EEPROM. In another embodiment, the apparatus includes a solid state drive (SSD) or other mass storage device. In another embodiment, the apparatus comprises a USB or other "flash drive" or other such portable removable storage device.

In another aspect, a camera apparatus is disclosed. The camera apparatus comprising a display screen including a plurality of pixels, each configured to emit light, and a plurality of microlenses, each configured to receive incoming light; a photosensor layer including a plurality of photosensors associated with each of the plurality of microlenses, the plurality of photosensors configured to detect the incoming light via one of the microlenses and generate output signals related thereto; and a processor apparatus configured to utilize the output signals to generate data relating to the detected incoming light for each of the respective plurality of photosensors, the data configured to enable combination with generated data of others of the plurality of photosensors for other microlenses to form an image. In one embodiment, the formed image is of higher resolution than that which can be obtained from individual ones of the plurality of photosensors.

Other features and advantages of the present disclosure will immediately be recognized by persons of ordinary skill in the art with reference to the attached drawings and detailed description of exemplary embodiments as given below.

Figure 1:
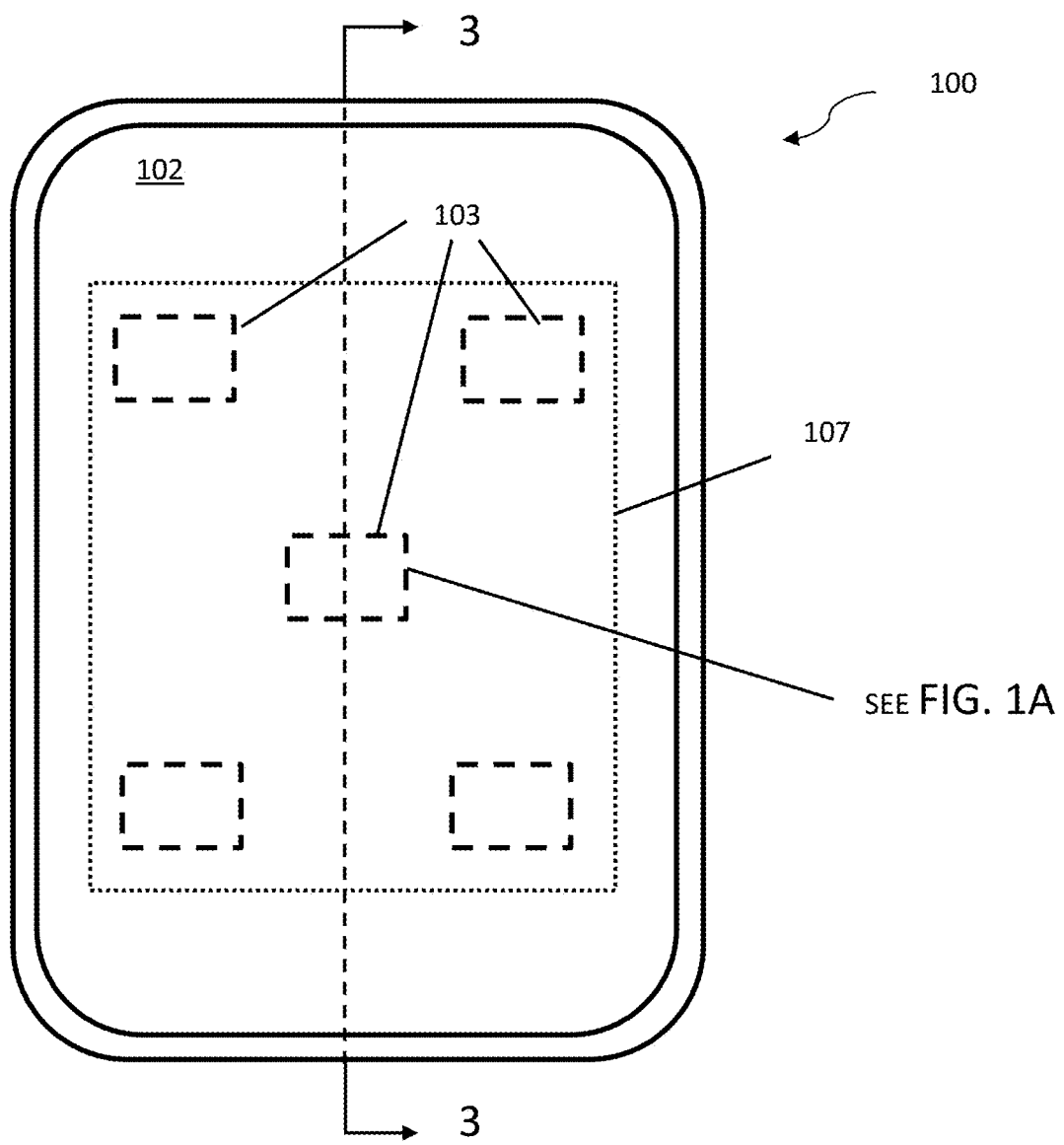
FIG. 1 is a front (display side) view illustrating an exemplary embodiment of a light-field camera and display apparatus, in accordance with the principles of the present disclosure.

All figures disclosed herein are © Copyright 2018-2019 GoPro Inc. All rights reserved.

DETAILED DESCRIPTION

Implementations of the present technology will now be described in detail with reference to the drawings, which are provided as illustrative examples and species of broader genus' so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Advantages Over Existing Systems—

Existing electronic devices have separate camera and display systems. For example, current smartphones typically have a single conventional camera positioned at the top of the screen (i.e., the front-facing or "selfie" camera), as well as a rear-facing camera on the back of the phone. However, as discussed above, the focus of objects is typically in the center of the display screen, so positioning the front-facing camera above or at the top of the display screen introduces parallax—i.e., when a user is looking at an image displayed at or near the center of the screen, they are not looking into the camera, and vice versa. Additionally, positioning the front-facing camera above or at the top of the display screen takes up valuable real estate on the display, forcing it to be otherwise smaller than it could be.

The prior art has attempted to solve the foregoing issues with respect to parallax and/or effective usable area of the display screen by disposing one or more cameras behind the display screen and near the center of the display screen. For example, see U.S. Patent Application Publication No. 2007/0002130 filed Jun. 21, 2005 and entitled "Method and apparatus for maintaining eye contact during person-to-person video telecommunication." Yet, not only does placing one or more cameras behind a display screen require complex design considerations, but such concepts are still limited with respect to depth of field and view as they utilize conventional cameras. More specifically, since conventional cameras record light intensity only (depth of field and view are limited), if an object (such as a finger) is covering a camera behind the screen, that object will obstruct at least a portion of the image captured by that camera.

In contrast to conventional cameras, so-called "light-field" cameras (e.g., the Light L16 Camera manufactured by Light Corporation) not only record the intensity of light, but also the direction that the light rays are traveling in space. Hence, there are several advantages over existing systems by using an array of these mini-cameras, which together form a light-field camera, within a display. For example, as the screen essentially is the camera (made up of mini-cameras), display space is optimized, and there are no parallax issues—i.e., the user is looking at the screen and the camera at the same time. Additionally, depth of field and focus can be computationally controlled, and background can be removed or changed easily. Moreover, partial obstruction is not an issue (e.g., fingers on the screen can be ignored via processing within the device or subsequently after transfer of the image data).

In other words, in various embodiments, the camera and display apparatus of the present disclosure may be used to, inter alia, resolve parallax effects between captured content and displayed content, enable optimized depth of field, and/or increase effective usable display area.

Exemplary Display Apparatus—

Figure 1A:
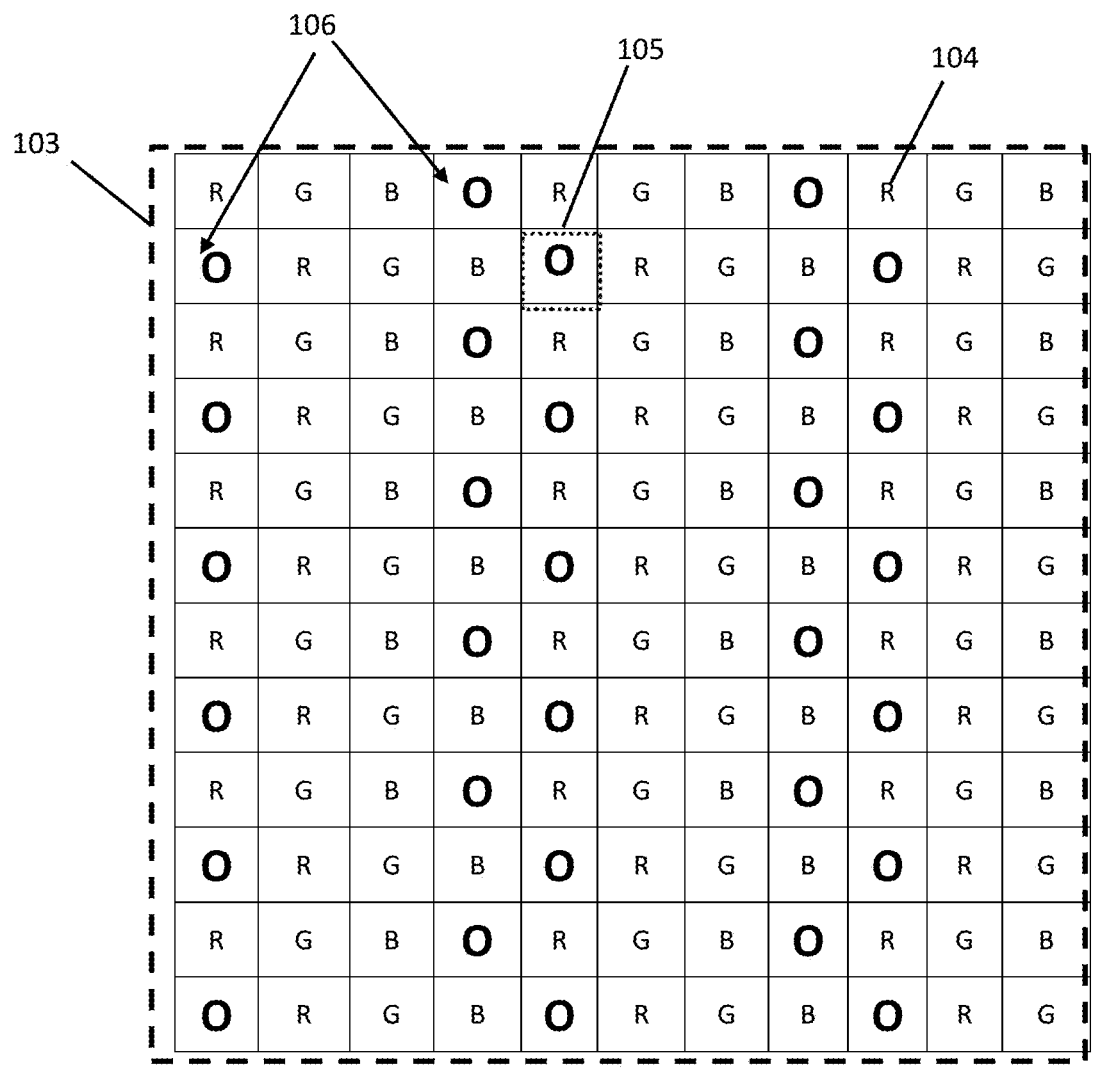
FIG. 1A is an elevation view illustrating a first exemplary embodiment of a portion of the display screen of the light-field camera and display apparatus of FIG. 1, in accordance with the principles of the present disclosure.
Figure 1B:
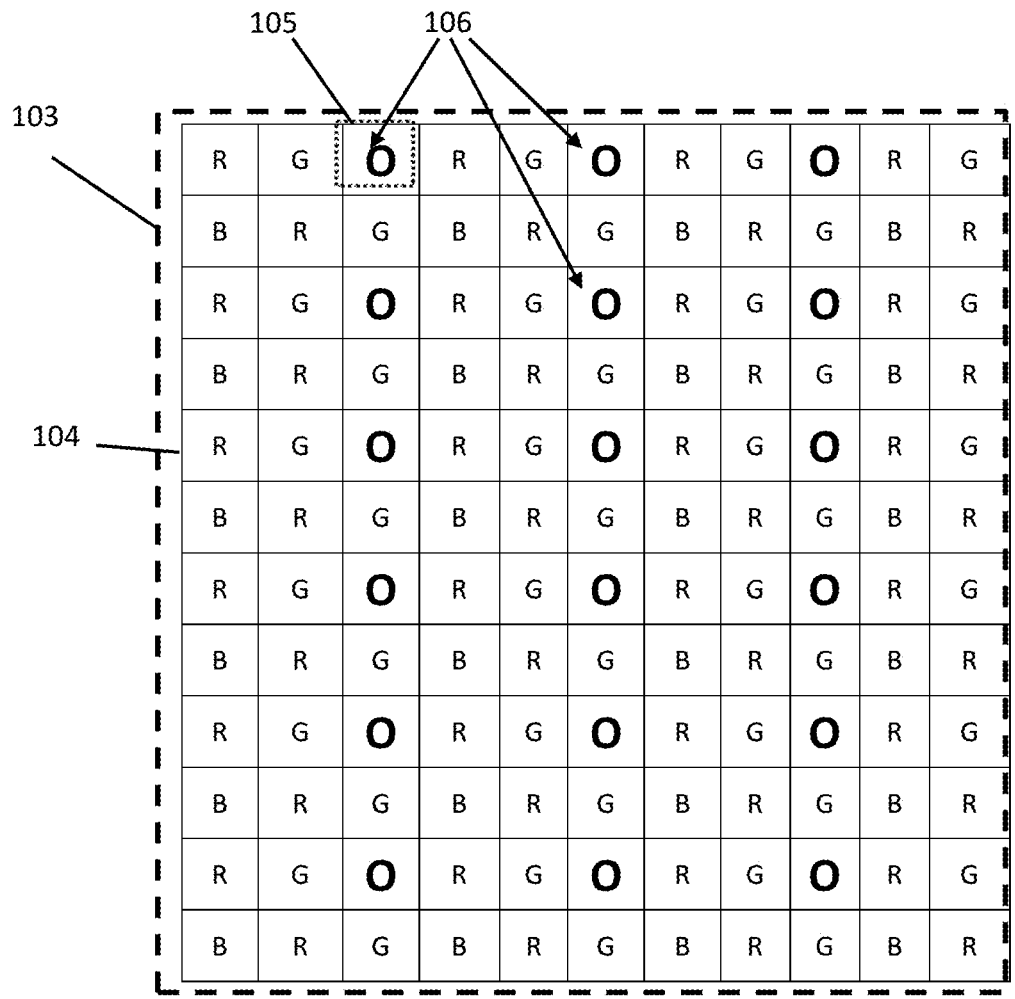
FIG. 1B is an elevation view illustrating a second exemplary embodiment of a portion of the display screen of the light-field camera and display apparatus of FIG. 1, in accordance with the principles of the present disclosure.

FIG. 1 illustrates an exemplary embodiment of a camera and display apparatus (herein referred to as "display apparatus" or "camera apparatus" for brevity) 100, in accordance with the principles of the present disclosure. The display apparatus 100 includes a display screen 102. FIG. 1A illustrates one configuration of a portion 103 of the display screen 102 in further detail. It will be appreciated that several such portions 103 on the same display screen are contemplated in some embodiments of the present disclosure, with their disposition being according to a prescribed geometry or pattern ("array") as discussed in greater detail subsequently herein. For instance, as shown in FIG. 1, the portions 103 having the described "camera" elements may be discretely distributed throughout the display area (e.g., N separated portions 103 as shown forming the array 107, where N=5). Alternatively, the portions 103 may be distributed across the whole of the display, such that they form a prescribed pattern (e.g., rows and columns of portions, etc.). Moreover, each portion 103 may have a prescribed shape and size, which may also be homogeneous or heterogeneous across the display 102 (e.g., those at the periphery may have different dimensions/shapes than those at or near the center of the display).

As shown in FIG. 1A, the given portion 103 of the display screen 102 includes a plurality of display pixels 104. In one embodiment, a pixel is a controllable element of an image represented on the display screen. That is, each pixel may be independently controlled and output light at a particular color and intensity. In color imaging systems, a color is typically represented by three or four component intensities such as red, green, and blue (RGB), or cyan, magenta, yellow, and black. Additionally, although FIG. 1A shows pixels as squares, pixels 104 are not limited to such shape, nor any size diameter or size. A pixel can be of any shape including for example circular, elliptical, polygonal, etc.

Moreover, it will be appreciated that for sake of simple illustration, the disposition of pixels (and in fact the camera elements 105) on the display are shown in FIG. 1A as rows and columns; i.e., each pixel is at 90-degree angles to each other pixel. As described below in greater detail with respect to some alternate embodiments, pixels 104 and camera elements 105 may be disposed in the display 102 according to any number of different patterns, including for example: (i) "shadow mask" where the pixels are disposed in a repeating pattern such as R-G-B in any given row, but the rows are offset from one another such that e.g., every other row is effectively identical in alignment; (ii) "aperture grille," or "stripes." wherein elongated pixels (or aggregations of pixels) alternate in stripes according to a pattern; or (iii) "diagonal," where rows or columns of commonly colored pixels are disposed in a diagonal with one another, the diagonal next to a similar diagonal of another color pixel, and so forth. As such, the methods and apparatus described herein may be used with literally any pixel geometry, as will be recognized by those of ordinary skill given the present disclosure.

Referring again to FIG. 1A, the display screen 102 includes a plurality of camera elements or regions 105 each having a pinhole or microlens 106 disposed in a prescribed pattern 107. In its most basic sense, a pinhole may feasibly be a small circular hole; but with respect to some embodiments, the pinhole may also be configured acts as a lens, e.g., focusing light incident on the display device such as from a subject being imaged. In one embodiment, a microlens is utilized for such purpose; a microlens is a small lens (i.e., a transmissive optical device that focuses or disperses a light beam by means of refraction). These microlenses may be formed as part of the display device process or as part of other components (e.g., the regions of the outer "Gorilla Glass" or similar environmental cover may be constructed e.g., punctuated with microlenses), or as part of layers further down in the display device (such as where the apertures or pinholes are filled in with a material having the desired physical and optical properties).

It will be appreciated that while generally shown as an aperture or microlens 106 of a diameter generally comparably to the diameter of an RGB pixel, the apertures or microlenses may be of larger or smaller diameter, depending on the desired resolution, configuration of the underlying array (see FIGS. 2A-3), and other considerations such as the user's ability to visually resolve them, as discussed subsequently herein.

In the various exemplary embodiments of FIGS. 1A-1E, the pinhole or microlens 106 is one in an array of similar pinholes or microlenses, respectively. Although pinholes and microlenses have the foregoing distinct characteristics, the present disclosure refers to pinholes and microlenses interchangeably as they both can be utilized. They may also feasibly be used heterogeneously (i) within different regions of the display 102, or (ii) within the same portion 103.

According to various exemplary embodiments of the present disclosure, each microlens 106 is positioned adjacent to one or more pixels 104. For example, as explained elsewhere herein, a typical 3-tuple pixel format is "RGB," wherein the first value is red wavelength or intensity, the second is green intensity, and the third is blue intensity. Camera pinholes do not need to be at every screen pixel (or group/tuple of pixels); using every other pixel or line/row, or similar is sufficient, and in fact more sparse patterns are contemplated (as are non-uniform patterns, such as concentric rows of non-linearly changing radius from a geometric center of a display, polygons, etc.). Hence, instead of having the typical configuration of RGB, RGB, RGB pixels, the portions 105 of the display screen 102 of the present disclosure, in one exemplary embodiment, might have the configuration of pixels 104 and microlenses 106 as RGBC, RGBC, RGBC (where "C" is a pinhole (or microlens) for the camera display apparatus) as shown in FIG. 1. Note that in FIG. 1A, the successive rows are each offset from one another by a pixel; as discussed elsewhere herein, this pattern can be substituted by literally any other pattern or offset as desired, the illustrated offset row/column approach being merely illustrative.

Additionally, in some embodiments, the microlenses 106 can respectively replace some of the display pixels 104 of display screen 102. Therefore, relative to the typical resolution of the display screen 102, a certain number of pixels 104 would be omitted from the display screen 102. For example, while a typical display might have a pixel resolution of 1280×1024, corresponding to 3×1280×1024 (or about 3.9M) individual color pixels, a display screen 102 of the same size, according to the present disclosure, in one variant, might have around 3.7M individual color pixels, if a microlens 106 replaces one pixel 104 in every 8×8 pixel block. In the above example, 245,760 microlenses would replace 245,760 pixels 104. Additionally, pixels 104 can be omitted/replaced according to various configurations or according to one or more rules or patterns.

For example, according to various implementations, the display pixels 104 can be omitted/replaced based on their wavelength. For instance, in one implementation, the types of pixels are evenly omitted such that if the first omitted pixel is red, the next set should omit a pixel of green wavelength, the third set should omit a pixel of blue wavelength, and so on—e.g., instead of the typical configuration of RGB, RGB, RGB pixels on the display, the display might be CGB, RCB, RGC (where "C" is a hole or microlens 106 for the camera and display apparatus 100).

In other implementations, certain types of pixels may be omitted/replaced more than other types of pixels. For example, it is known that human eyes are in some scenarios less sensitive or perceptive of changes in blue pixel density than other colors (e.g., a missing blue pixel may be perceived less often than a missing red or green pixel). Thus, omitting more blue intensity pixels relative to pixels of other intensities would likely be less perceptible to a user. For example, in one exemplary implementation, 10% of all blue pixels could be replaced, whereas only a smaller percentage (e.g., 4%) of red pixels and of green pixels could be replaced. In another implementation, only blue pixels may be replaced—e.g., instead of the typical configuration of RGB, RGB, RGB pixels, the display screen 102 might be configured as RGB, RGC, RGB, RGC (where "C" is a hole or lens 106 for the camera and display apparatus 100). See e.g., the exemplary implementation of FIG. 1B, wherein every other row of pixels has each of its blue (B) pixels replaced with a microlens 106.

Additionally, in some embodiments, the omission of such pixels is configured to be unnoticeable to the human eye, at least at the average distance a user looks at a screen. Generally speaking, for the user to be unable to discern pixels as separated or missing, the pixels have to be at smaller angular distance than the eye's angular resolution. Hence, the ability to discern separate pixels of a display—and in the context of this disclosure, the omission of certain pixels of a display—can depend not just on the display's resolution, but also on its size and the distance from which the user is viewing it. Accordingly, in various implementations of the present disclosure, the configuration and number of pinholes or microlenses 106 that replace respective pixels 104 can vary and be optimized based at least on the resolution of the display, the size of the display, and/or the average distance from which a person typically views the display.

For example, displays of smartphones and tablets are typically viewed at around the same distance (e.g., 25 cm); however, smartphones typically have smaller screens than tablets. Accordingly, a smartphone with the same resolution as a larger-sized tablet may have more pixels per inch, and therefore allow more pixels to be replaced without being noticed by the average human eye with respect to a viewing from the same distance. Additionally, while TVs typically have bigger displays than smartphones and tablets, TV's are typically viewed at a further distance. Therefore, even though a 40" TV with a resolution of 1920×1080 would have 55 ppi (pixels per inch) and a 5" smartphone with a resolution of 1920×1080 would have 443 ppi, the perceptibility of the omitted pixels for each of the foregoing would be about the same when approximately a same percentage of pixels could are replaced because the typical person views a TV at a farther distance than from a smartphone. Notwithstanding the foregoing, modern electronic devices have such high resolution—e.g., 4K (3840×2160 pixels) or 8K (7680×4320 pixels) or 4000×3000 pixels and above—the average person would likely not notice the missing pixels replaced by the pinholes or microlenses required to enable functioning of a light-field camera in the various embodiments described herein.

Figure 1C:
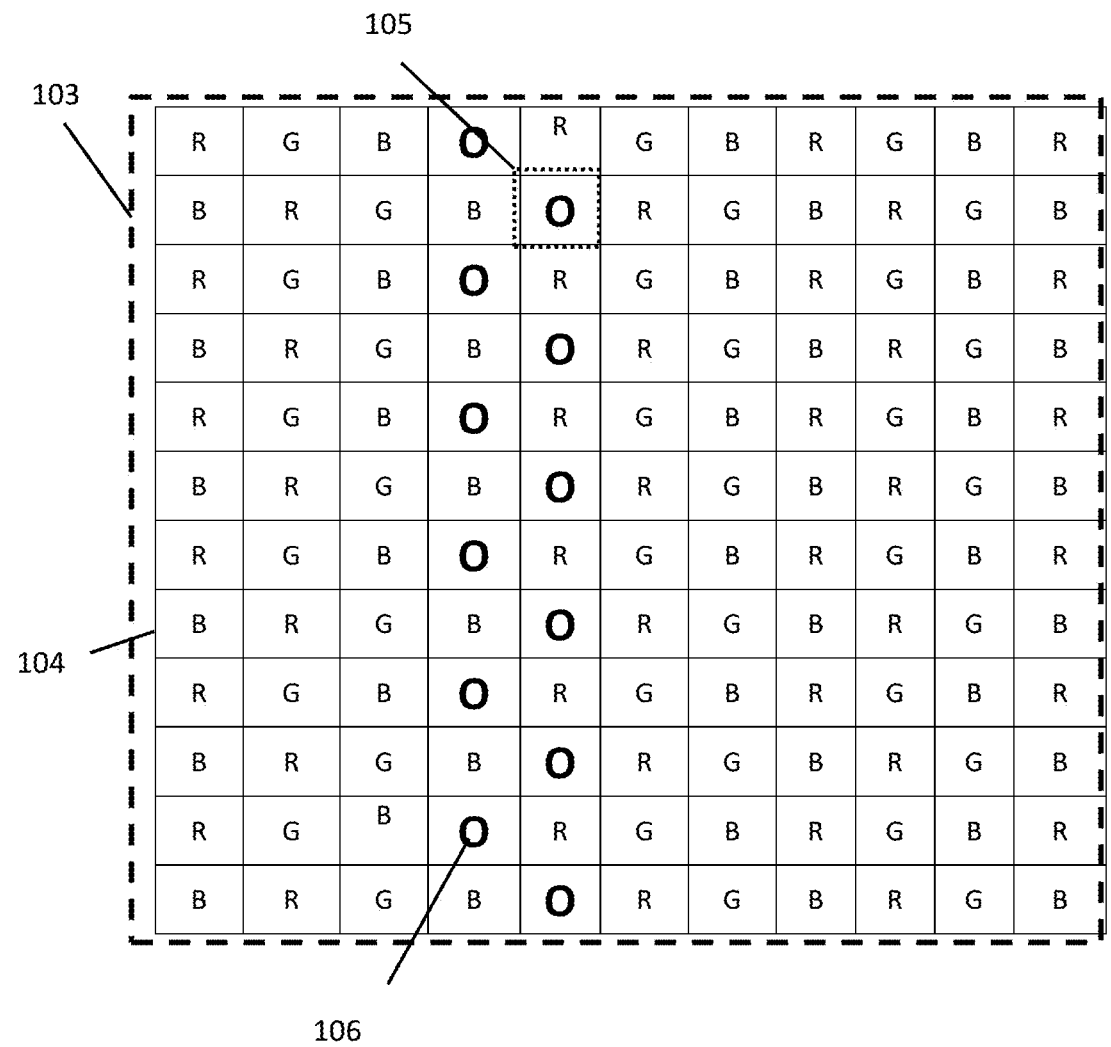
FIG. 1C is an elevation view illustrating a third exemplary embodiment of a portion of the display screen of the light-field camera and display apparatus of FIG. 1, in accordance with the principles of the present disclosure.

FIG. 1C illustrates yet another exemplary embodiment of a camera portion 103 of the display 102, wherein an RGBC, RGB, RGB, RGBC repeating pattern is utilized in each row of pixels. As in the previous embodiments, the rows are offset or staggered as well, but as above this is merely exemplary.

Figure 1D:
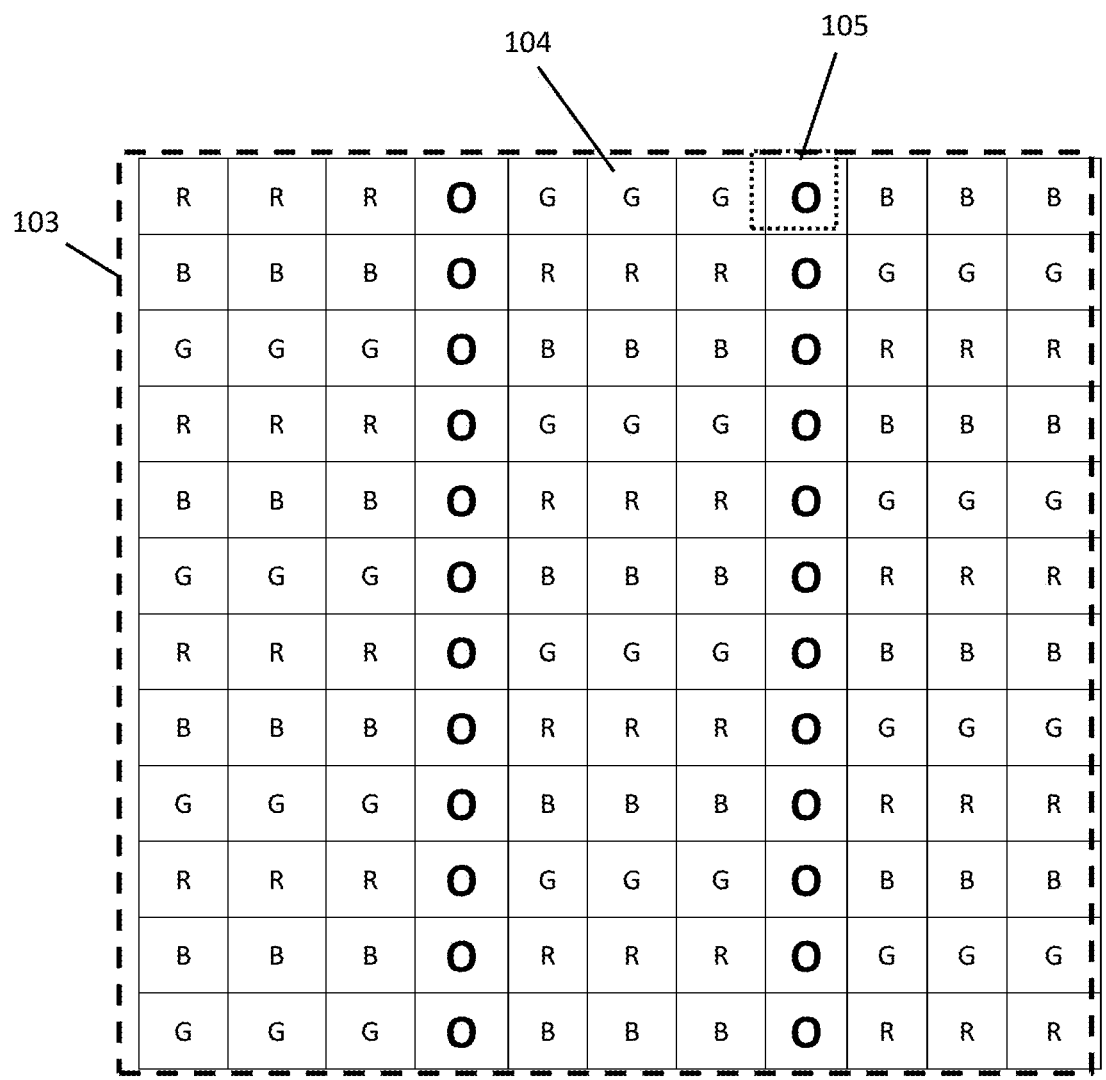
FIG. 1D is an elevation view illustrating a fourth exemplary embodiment of a portion of the display screen of the light-field camera and display apparatus of FIG. 1, in accordance with the principles of the present disclosure.

FIG. 1D illustrates yet a further exemplary embodiment of a camera portion 103 of the display 102, wherein elongated common-color pixel arrays are used, and camera elements 105 with microlenses 106 are interposed between the arrays. Specifically, as shown, a set of elements of a first color (RRR) are interspersed with similar sets of pixels of other colors (e.g., GGG, and BBB) by camera elements 105. As in the previous embodiments, the rows are offset or staggered as well, but as discussed above this is merely exemplary.

Figure 1E:
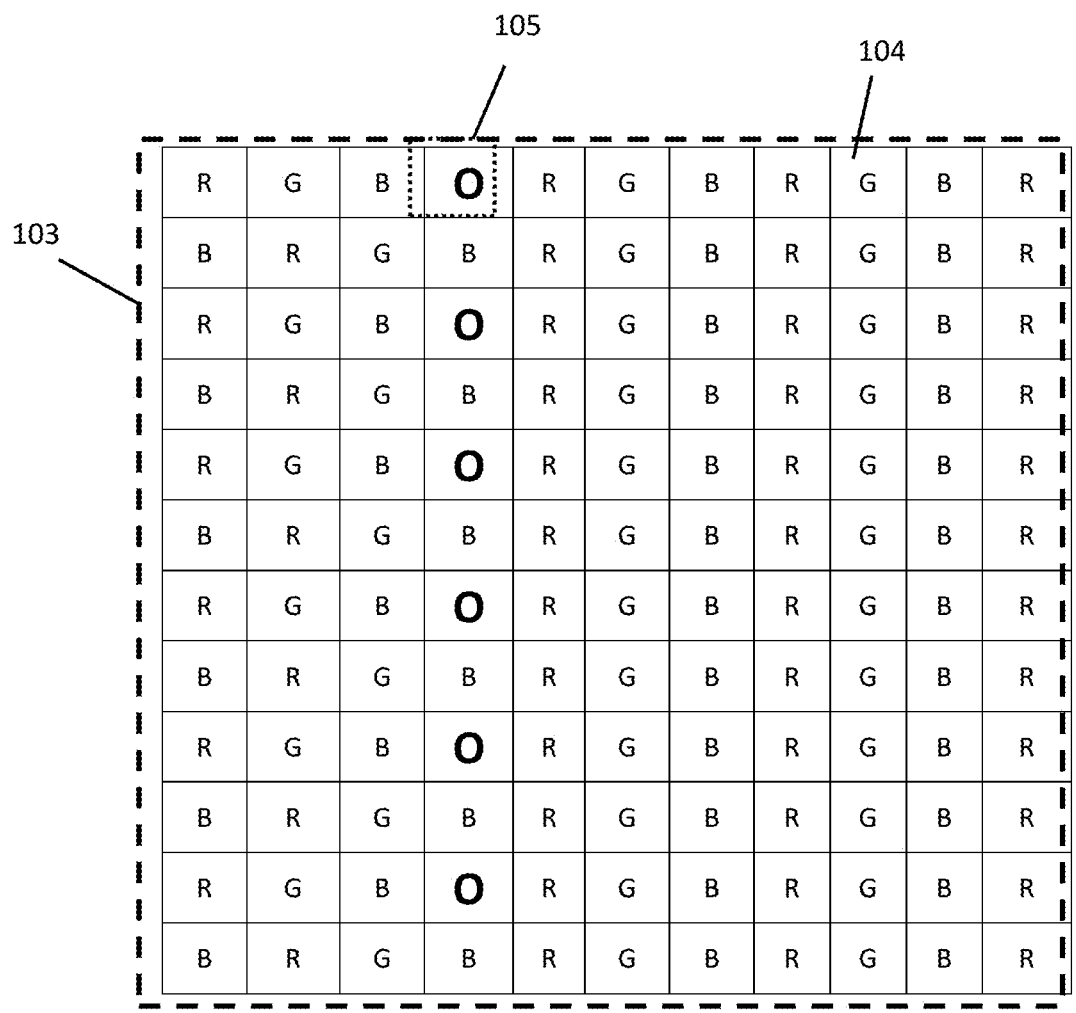
FIG. 1E is an elevation view illustrating a fifth exemplary embodiment of a portion of the display screen of the light-field camera and display apparatus of FIG. 1, in accordance with the principles of the present disclosure.

FIG. 1E illustrates yet another exemplary embodiment of a camera portion 103 of the display 102, wherein an RGBC, RGB, RGB, RGBC repeating pattern is utilized in alternating row of pixels, with the interposed rows having an RGB, RGB, RGB organization (i.e., no camera elements 105 in the alternating rows). As in the previous embodiments, the rows are offset or staggered as well, but as discussed above this is merely exemplary. Moreover, the number of "skipped" rows may be varied as desired (e.g., 1, 2, 4, 16, etc.).

Figure 2A:
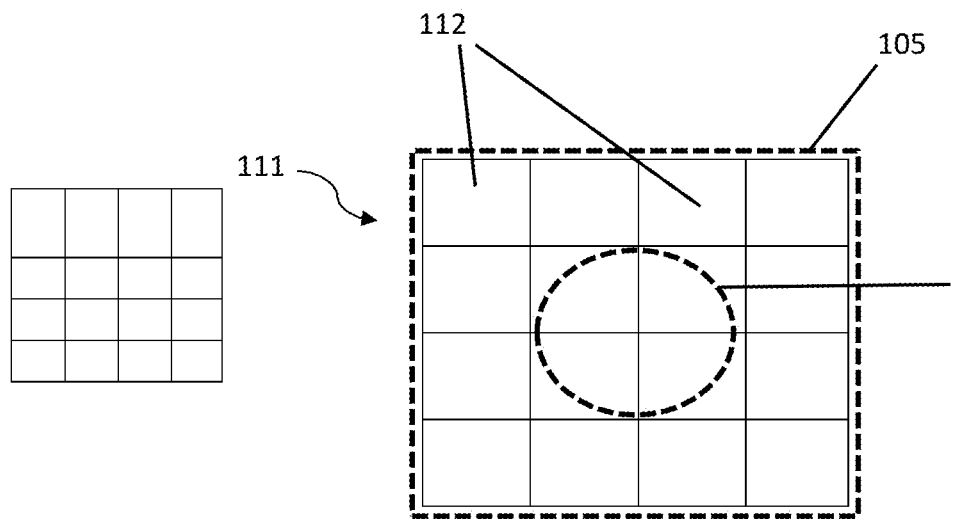
FIG. 2A illustrates a first exemplary embodiment of a photosensor layer of the light-field camera and display apparatus of FIG. 1, in accordance with the principles of the present disclosure.

Referring now to FIG. 2A, one exemplary embodiment of a photosensor layer 110 of the display apparatus 100 is shown. The sensor layer 110 includes a 2D array of photosensors (also referred to herein as "photoreceptors") 112. The photosensors (or photoreceptors) 112 can be any imaging devices or sensors (e.g., CMOS-based devices) configured to capture, record, and/or convey still and/or video imagery, and/or data representative thereof. The photosensors 112 may be sensitive to visible parts of the electromagnetic spectrum and/or invisible parts of the electromagnetic spectrum (e.g., infrared, ultraviolet), and/or other energy (e.g., pressure waves). In some variants, photosensors 112 can be configured to convert light (visible electromagnetic radiation) into signals or values (whether analog or digital). In various exemplary embodiments of the present disclosure, individual photosensors 112 of the array capture light field data (via the passage of light through the pinholes or microlenses 106, shown by the dotted circle in FIG. 2A). According to various embodiments, the light field data represents or describes the amount of light flowing in every direction through every point in space; that is, the intensity of light in a space, and also the direction that the light rays are traveling in space.

The 2-dimensional (2D) sub-array 111 of photosensors 112 is positioned below each pinhole or microlens 106, such that each pinhole camera (including the 2D sub-array of photosensors 112 and a pinhole or microlens 106) would have a "low resolution" sub-array 111 of e.g., 4×4 sensors or 8×8 sensors or similar. Hence, an array 107 of these pinhole cameras (each pinhole camera with its own constituent low-resolution sub-array 111) is used to compute a full resolution image—e.g., 2.7K resolution (e.g., 2704×2028 pixels or 2704×1520 pixels) as described in greater detail subsequently herein.

It will be noted that in the embodiment of FIG. 2A, the array shown is a 4×4 array of 16 photosensors 112; this is merely exemplary, in that the array may be larger or smaller (and conceivably minimally only needing to resolve in one dimension, such as e.g., a 4×1 or even 2×1). Moreover, in this embodiment, the array is shown as being generally coextensive with the shape and size of the corresponding camera element 105 with which it is associated.

Figure 2B:
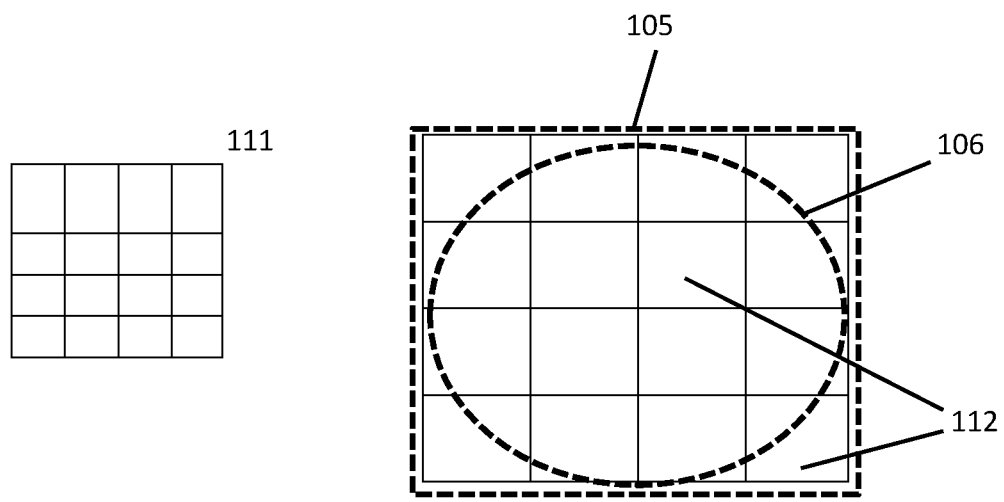
FIG. 2B illustrates a second exemplary embodiment of a photosensor layer of the light-field camera and display apparatus of FIG. 1, in accordance with the principles of the present disclosure.

FIG. 2B illustrates another embodiment of the photosensor configuration, wherein a similar array of 4×4 sensor elements 112 is used, but wherein the array is roughly comparable in size/scope to the diameter of the pinhole aperture or microlens 106.

Figure 2C:
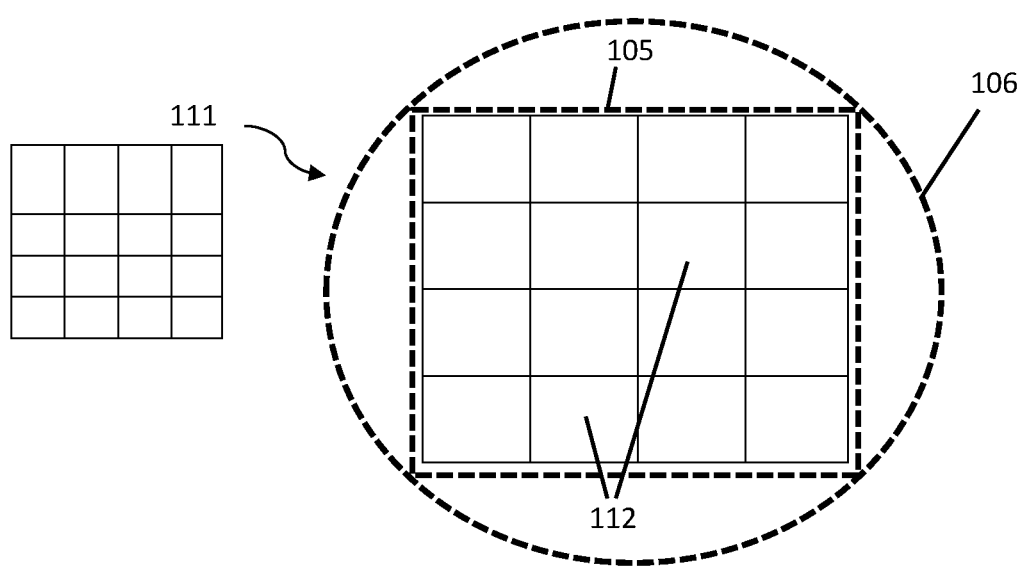
FIG. 2C illustrates a third exemplary embodiment of a photosensor layer of the light-field camera and display apparatus of FIG. 1, in accordance with the principles of the present disclosure.

FIG. 2C illustrates yet another embodiment, wherein a similar array of 4×4 sensor elements 112 is used, but wherein the array is sized to fit within the aperture or microlens diameter.

Figure 2D:
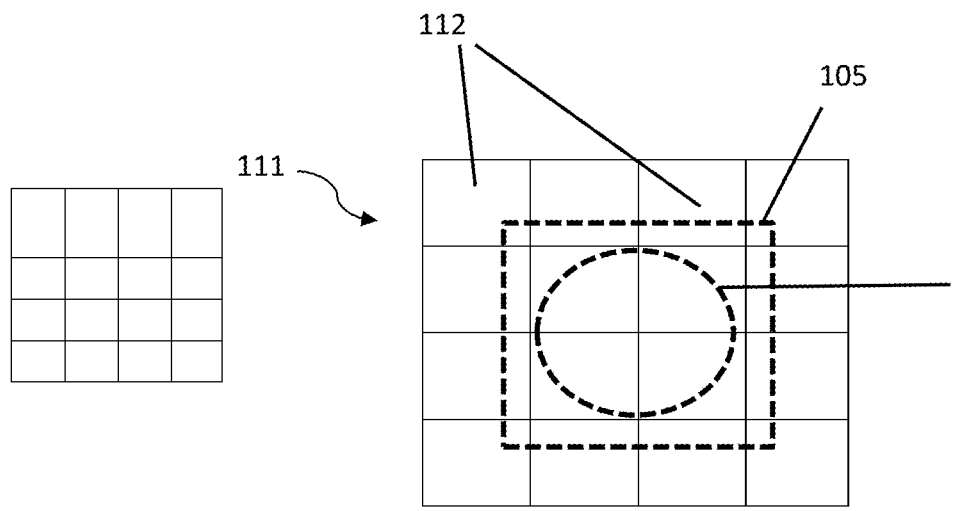
FIG. 2D illustrates a fourth exemplary embodiment of a photosensor layer of the light-field camera and display apparatus of FIG. 1, in accordance with the principles of the present disclosure.

FIG. 2D illustrates yet another possible configuration, wherein a similar sub-array of 4×4 photosensor elements 212 exceed the boundary of the associated camera element 105.

Figure 3:
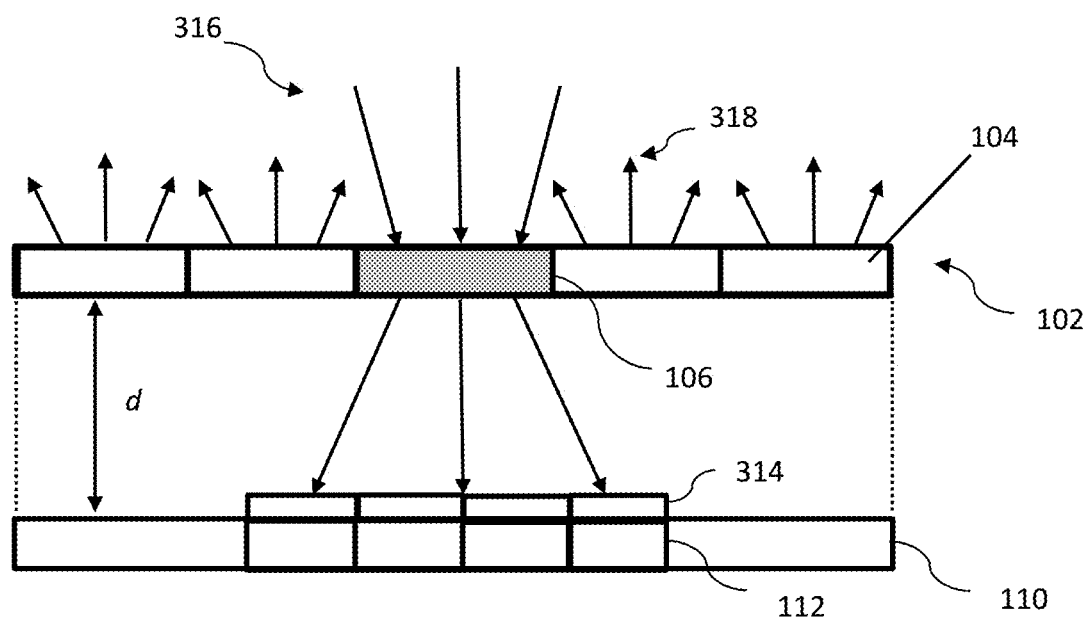
FIG. 3 illustrates a side view of an exemplary embodiment of a light-field camera and display apparatus, in accordance with the principles of the present disclosure.

From the foregoing, it will be appreciated that the relationship of (i) the size of each individual photosensor element relative to the pinhole or microlens diameter, and (ii) the size of each array of photosensors 112 relative to the pinhole/microlens diameter, may be varied as desired for the given lens polynomial or lens characteristics, as well as the standoff distance between the photosensor layer 110 and the display screen 102 having the pixels 104 and microlenses 106 (see FIG. 3).

Moreover, while the sub-arrays 111 are shown as individual or discrete aggregations of photosensor elements 112, it will be appreciated that the sub-arrays may be part of a larger array, such as where a continuous array (e.g., rows and columns) of photosensitive elements are formed as part of the layer 110 below the display screen 102 surface. This may be utilized for any number of reasons, including increased manufacturing efficiency or reduced cost (e.g., it may be more cost effective to simply manufacture an entire continuous sheet or layer of photosensitive elements, and only utilize subsets thereof—corresponding to the desired sub-arrays 111) for generation of signals.

Advantageously, due to the different viewpoints of the photosensors 112 in the array, any parallax of the object(s) within the captured images of the scene introduced by the different photosensors 112 in each array (and the overall geometry of the constituent arrays, which is fixed), can be processed out of the final image that is displayed. In other words, due to the different viewpoints of the individual camera sub-arrays, if an object is obstructing the light into one or more of the cameras in the array (such as a finger on the screen), data from those cameras can be omitted from the final image that is displayed.

Referring now to FIG. 3, a cross-sectional view taken along line 3-3 of the exemplary embodiment of the display apparatus 100 of FIG. 1 is shown and described.

FIG. 3 shows two types of light: incoming light 316 and display light 318. The display light 318 is emitted from the pixels 104 of the display screen 102. The incoming light 316 will typically include at least a portion of display light 318 as some of display light 318 will be reflected off some object such as the user and back towards the photosensors 112. Accordingly, the incoming light 316 may pass through pinhole or microlens 106 to illuminate one or more of the photoreceptors or photosensors 112 in sensor layer 110. As shown, the light 316 may be refracted or bent at different angles, depending on the characteristics of the microlens if used.

In one embodiment, the value or output generated at each sensor element 112 is determined by the sum of the irradiance of all the incident light 316 (and reflected portions of light 318 if any) that illuminates it. However, the inclusion and/or interference of the portion of the display light 318 with respect to the incoming light 316 might be undesirable in the display of a captured image. Accordingly, in various exemplary embodiments of the present disclosure discussed in further detail below, processing/logic can be used to subtract the display light 318 from value output by each sensor element 112, wherein the output value represents the sum of the irradiance of the light 316 and any reflected portion of the pixel light 318 that illuminates each sensor 112. For instance, in one particular implementation, the local or adjacent pixels 104 to the camera element 105 may contribute all of the significant reflected pixel light that is ultimately received by the sensor elements 112; other more distant pixels may have little or no impact on the values ultimately generated by each sensor element 112 during operation. As such, a characterization or profile of the display under controlled conditions (e.g., while generating a test pattern within a completely dark environment) can be generated to determine a "background" value of cross-contamination of the camera elements 105 (or even individual sensor elements 112 thereof) by various pixels 104 of the display, such that these background values may be subtracted out during normal operation.

The "color" of a camera element 105 may be computed by summing the values of the irradiance of the light 316, 318 that illuminates each sensor element 112 (minus the components associated with pixel-generated light 318 that is reflected with the incoming light 316 as discussed above). In some implementations, the summation may be weighted, such that different frequencies or wavelengths of light 316, 318 contribute different fractions to the sum. Weights may be assigned, for example, as a function of the location of the intersection between the light 316 and the display screen 102, relative to the center of a particular camera element 105 or microlens 106. Any weighting algorithm known in the art can be used; some common algorithms include, for example, a Gaussian weighting algorithm, a bicubic weighting algorithm, a bilinear weighting algorithm, etc.

Additionally, according to various exemplary embodiments of the present disclosure, the photosensors 112 can be configured with filters 314, whether broadly applied or arranged in a certain pattern. For example, the photosensors 112 can be configured as a Bayer color array. A Bayer color array is a particular 2×2 pattern of different color filters; the filter pattern is 50% green, 25% red and 25% blue. In alternative embodiments, each pinhole or microlens 106 (as opposed to the photosensors 112) could have a color filter. Regardless of whether filters are applied to one or more of the photosensors 112 or the microlens 106, ultimately, the pinhole cameras (each pinhole camera referring to a 2D array of photosensors 112 and a microlens 106 in some exemplary embodiments) are configured to measure both color and direction of light. From a large array of these mini-cameras 105 and their associated sub-arrays 111, a full resolution image can be computed.

Utilizing the filter pattern (e.g., Bayer filter) enables, inter alia, the capture of image data in multiple color channels from the reference viewpoint. Such image data can be used to determine camera element 105 similarity. For example, the depth and visibility of camera elements in one channel can be compared to the depth and visibility of camera elements in one or more other color channels. To obtain a full-color image the pattern must be converted to full-color pixels. For this conversion, various de-mosaicing algorithms can be used to interpolate a set of complete red, green, and blue values for each sensor sub-array 111 (or even each constituent sensor element 112). These algorithms make use of the surrounding sensors of the corresponding colors to estimate the values for a particular sensor. Such conversion can take place prior to the display of the image(s), so that the displayed image(s) can be reconstructed without differentiation. In alternative variants, separate reconstruction can be performed for each color channel.

Figure 4:
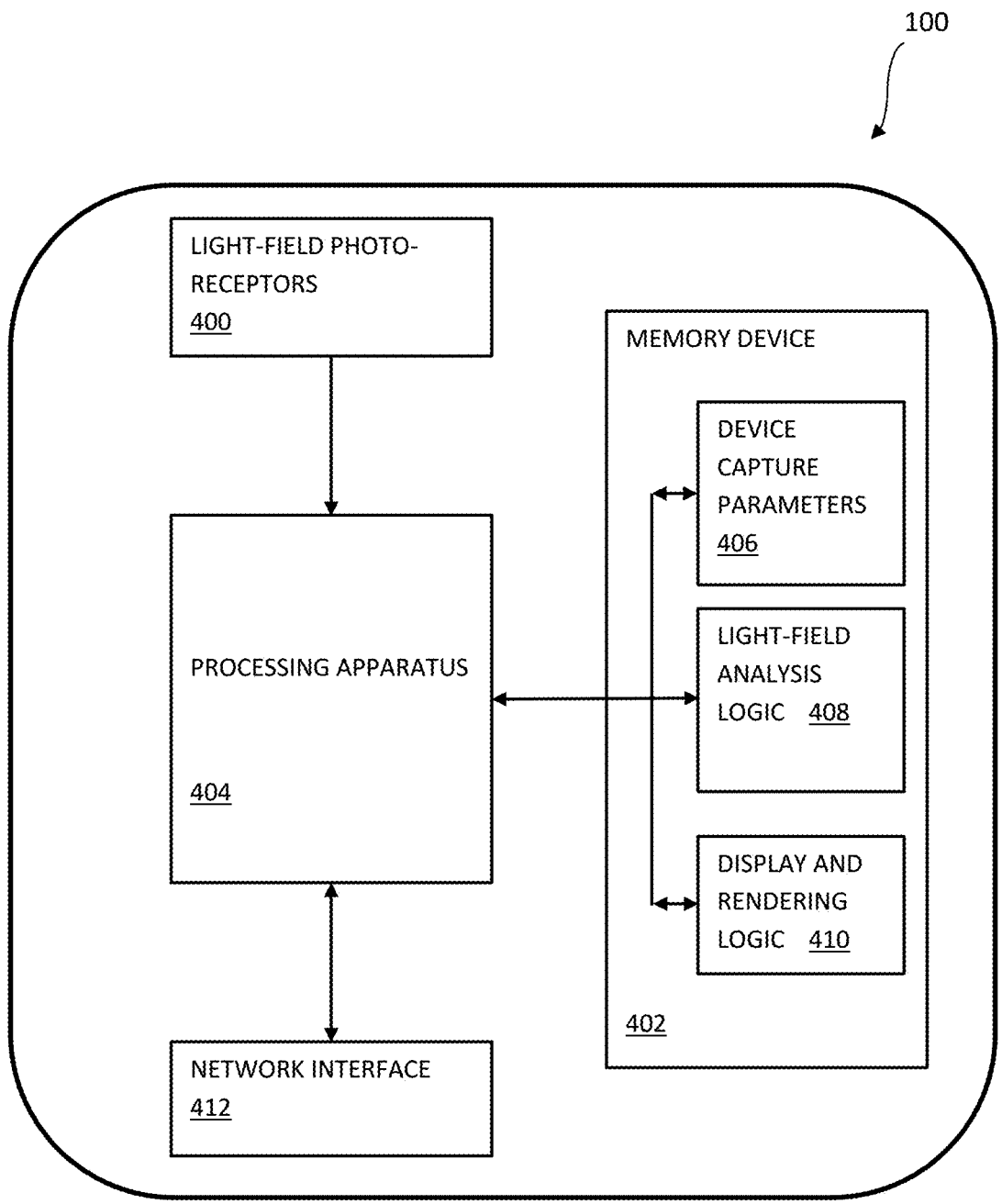
FIG. 4 is a block diagram of an exemplary embodiment of a light-field camera and display apparatus, in accordance with the principles of the present disclosure.

Referring now to FIG. 4, a block diagram of an exemplary embodiment of the camera and display apparatus 100, in accordance with the principles of the present disclosure, is shown. The display apparatus 100 may represent an implementation of, for example, a capturing, processing, and/or displaying device for the purpose of implementing the mechanics and methodologies provided herein of, for example, an image or video content. In various embodiments, the depicted camera and display apparatus 100 may be used to, inter alia, resolve parallax effects between captured content and displayed content, enable optimized depth of field, and/or increase effective usable display area.

In some embodiments, the camera and display apparatus 100 operates as a standalone device or a connected (e.g., networked) device that connects to other computerized devices (e.g., one or more user devices) or systems. Data communication with other devices may be performed via a wireless or wired interface (e.g., network interface 412 of FIG. 4).

As used herein, the terms "device" or "computing device" or "computing system" includes, but is not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, cellular telephones, smartphones, personal integrated communication or entertainment devices, televisions (TVs), or other types of client devices or user devices (mobile or otherwise), or literally any other device capable of executing a set of instructions.

The camera and display apparatus 100 includes photoreceptors or photosensors 400, which in some variants, are the same as the photoreceptors or photosensors 112 in FIGS. 2A-2D. The photoreceptors 400 can be any imaging devices or sensors configured to capture, record, and/or convey still and/or video imagery, and/or data representative thereof. The still and/or video imagery may be sensitive to visible parts of the electromagnetic spectrum and/or invisible parts of the electromagnetic spectrum (e.g., infrared, ultraviolet), and/or other energy (e.g., pressure waves). Additionally, the photoreceptors 400 can be configured to convert light (visible electromagnetic radiation) into signals or values.

In various exemplary embodiments of the present disclosure, the photoreceptors 400 capture light field data that represents or describes the amount of light flowing in every direction through every point in space; that is, the intensity of light in a space, and also the direction that the light rays are traveling in space can be resolved from the photosensors. Such captured/recorded/conveyed light-field image data can transmitted from the light-field photo-receptors 400 to one or more other components of the camera and display apparatus 100, such as the processing component 404.

As used herein, the term "processing component" or "processing unit" or "processor apparatus" or "processor" is meant generally to include digital processing devices. By way of non-limiting example, digital processing devices may include one or more of central processing units (CPUs), graphics processing units (GPUs), digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, a controller, a state machine, application-specific integrated circuits (ASICs), one or more radio-frequency integrated circuits (RFICs), and/or other digital processing devices, or any combination of the foregoing. Such digital processors may be contained on a single unitary integrated circuit (IC) die, or distributed across multiple components.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

The processing apparatus 404 is configured to process captured light-field image data received from the light-field photo-receptors 400. The light-field image data can include, for example, raw light-field data (i.e., from each individual sensor element 112), aggregated data (e.g., from a sub-array or portions thereof, such as may be pro-processed by logic or circuitry associated with an ISP or other processing device which may be used within the architecture prior to the processing component 404), device capture parameters 406, etc. The device capture parameters 406 may include a variety of data regarding the image(s) captured, the display apparatus 100 and/or associated device, and/or components thereof. It may also include polynomial information for the microlenses (where used) in some embodiments, such as where microlenses with heterogeneous characteristics are used in the various camera elements 105 of the same device 100. The processing apparatus 404 can process the light-field data (as described above) from the light-field photo-receptors 400 or associated logic to provide an image and light-field parameters, which may include a variety of data regarding the image. The processing apparatus 404 can also utilize the device capture parameters 406 in the processing of the raw light-field data, and can provide light-field parameters in addition to the image. The light-field parameters may be the same as the device capture parameters 406, or may be derived from the device capture parameters 406 via processing conducted by e.g., the processing apparatus 404.

In some embodiments, the light-field parameters and/or device capture parameters 406 may describe the light-field camera and display apparatus 100. For example, the parameters can describe a state or characteristic of the light-field camera 100 when it captures an image—e.g., the parameters can indicate, for example: (i) the relationship (distance) between the sub-array sensors 112 and the microlenses 106, (ii) the relationship between the camera elements 105 and other in the array 107, (iii) the type of filter used (e.g., Bayer filter), (iv) pixel 104 or microlens 106 depth and/or depth range for the entire image, (v) the field of view of the camera elements 105 (including for individual light-field sensor(s) 112), and (vi) properties of the captured image(s) (either individual pixels 104, or the entire picture/video) relative to the light-field camera and display apparatus 100 itself. Additionally as described in more detail below, in some exemplary embodiments, the device capture parameters 406 (or other parameters) may include subtraction parameters (i.e., the parameters used to subtract at least a portion of display light 318 that is leaked into the incoming "image" light 316). Such parameters may be stored in a main memory apparatus 402 and/or in association with the image(s) as metadata.

The main memory apparatus 402 of the device of FIG. 4 is configured to store image data, such as output by light-field photo-receptors 400, and/or a data representative thereof or derived therefrom, such as a compressed image data file. In addition, the memory 402 can also store other data representing the, for example, characteristics, parameters, and/or configurations of camera and the display apparatus 100 and/or a computing device of which camera and the display apparatus 100 may be associated. As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM. Memory 402 can include external and/or internal memory. In at least one embodiment, memory 402 can be provided at a separate device and/or location from display apparatus 100. For example, memory 402 may be a virtual storage system or "cloud" storage entity.

In some variants, the memory apparatus 402 may also include display and rendering logic associated with the light-field camera. In one implementation, such logic 410 may include a plurality of instructions (e.g., as part of one or more computer programs or software) configured to execute on the processor apparatus 404 and configured to utilize data generated by the analysis logic 408 to generate varying views or images based on data derived from the photosensors 112 of the sub-arrays 111 of the array 107 (or portions thereof). As used herein, the term "computer program" or "software" is meant to include any sequence or human or machine cognizable steps that perform a function. Such program may be rendered in virtually any programming language or environment including, for example, C/C++, C #, Fortran, COBOL, MATLAB™, PASCAL, Python, assembly language, markup languages (e.g., HTML, SGML, XML, VoXML), and the like.

For example one salient capability of the apparatus and methods described herein is the ability to generate multiple images from somewhat different perspectives, including blending or combination of such images to form a virtual moving image. As such, the exemplary apparatus 100 can be thought of as a "wide aperture array" of sorts capable of generating different combinations of imagery based on which subset of camera elements 105 are selected. As a simple example, consider where only the center and right-hand portions 103 of the array 107 of FIG. 1 are selected as the source or constituents of a given image to be generated. Each portion 103 (in this example three—one in the center and two on the right side of the display 102) each have a plurality of camera elements 105 (see FIGS. 1A-1E for exemplary configurations), and each camera element has its own sub-array 111 of sensor elements 112. Hence, a virtual aperture can be formed from the data generated by the (involved) sensor elements 112, and knowing their geometric and spatial arrangements (and the characteristics of any microlenses 106 used), an image can be formed as if a single-lens camera were disposed at the virtual aperture. In contrast to comparatively crude prior art approaches of compensating for parallax/aspect (e.g., processing to algorithmically shift or rotate the image data captured from a single, off-aspect camera), the techniques of the present disclosure advantageously allow not only for collection of multiple images simultaneously from conceivably a large number of different "virtual perspectives", but also subsequent processing, modification, alteration, stitching, etc. of these multiple different virtual images, with none of the artifact introduced by the aforementioned prior art approaches (e.g., distortion of a user's appearance due to e.g., inaccuracies in the modeling of the object for FOV by the correction algorithm). Moreover, the techniques and apparatus of the present disclosure can utilize predetermined or user-generated templates or "moves" that can be programmed into the processing and analysis logic 408 or display/rendering logic 410 such that the apparatus will automatically generate certain views or combinations of views. For instance, by utilizing one subset of the camera elements 105 of a given array 107 to form a first image, and an at least partly different subset of the array 107 to form another image, spatially different perspectives may be obtained from the same apparatus 100 staying in the same physical position. These may be generated individually for a user (e.g., in sequence, as part of a video, etc.), as a mosaic, as overlays of one another, or even combined using more computationally sophisticated processes (e.g., within the algorithms of the logic 410) so as to form a single combined image. High-quality "cinema grade" imagery and video can therefore be generated, advantageously from an apparatus 100 that is stationary.

As noted above, the apparatus may also include a network interface 412, which allows for data transfer onto or off of the apparatus 400 to e.g., a user platform such as a PC, laptop, smartphone, or a cloud or networked entity. As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), Wi-Fi (802.11), WiMAX (802.16), PAN (e.g., 802.15, Bluetooth/BLE), cellular (e.g., 3G, LTE/LTE-A/TD-LTE, 5G NR, GSM, and/or other cellular technology), IrDA families, internets, and intranets, and/or other network interfaces. As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

In some embodiments, the network interface 412 can be in data communication with a server apparatus (not shown) for e.g., cloud-based storage and/or processing of data. For instance, in one variant, it is contemplated that the locally (i.e., onboard the apparatus 100) processed data is transmitted via the interface which may be a low latency 5G NR interface with e.g., 1 ms latency guarantee, such that the data can be efficiently transferred to a cloud processing entity for more sophisticated multi-image processing such as the aforementioned multi-perspective "virtual" imaging (thereby allowing the user apparatus 400 to be simpler and less costly), and then returned to the user device 100 or another designated platform for display/rendering. As used herein, the term "server" refers to any computerized component, system or entity regardless of form which is adapted to provide data, files, applications, content, or other services to one or more other devices or entities on a computer network. In a networked deployment, the camera and display apparatus 100 may operate in the capacity of—and/or may be included as part of a computing device that operates in the capacity of—a server or client in a server-client network environment, or as a peer device in a peer-to-peer (or distributed) network environment.

The processor apparatus 404, memory 402, and the network interface 412 and sensors 400 (e.g., sub-arrays 111) may each communicate via one or more buses. As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, for example, different memories in a system. Common bus architectures include for instance USB and PCIe.

As described elsewhere herein, the value or output of each individual sensor element 112 and/or photoreceptor 400 is determined in one variant by the sum of the irradiance of all the light that illuminates it at any given point in time. This light may not only include incoming light from the light-field of the scene being captured, but also light leaked or reflected from the display screen 102 (i.e., a portion of pixel display light 318). Accordingly, as discussed elsewhere herein, in various exemplary embodiments of the present disclosure, the device capture parameters 406 include the stored subtraction parameters (e.g., the previously described background characterization or profile) representing the light leaked into an image from the display screen 102. The light-field analysis logic 408 can then use the device capture parameters 406 to correct the image(s), including correction under various operational conditions or regimes (e.g., for images captured under low-light conditions as well as normal ambient conditions, or very bright conditions). As such, the corrections (e.g., substractions) can be scaled as a function of sensed ambient conditions; for instance, it may be that the correction for pixel "bleed-over" onto a sub-array 111 is inconsequential in normal or bright-light ambient conditions, and hence only need be applied under low-light or dark conditions).

Figure 5:
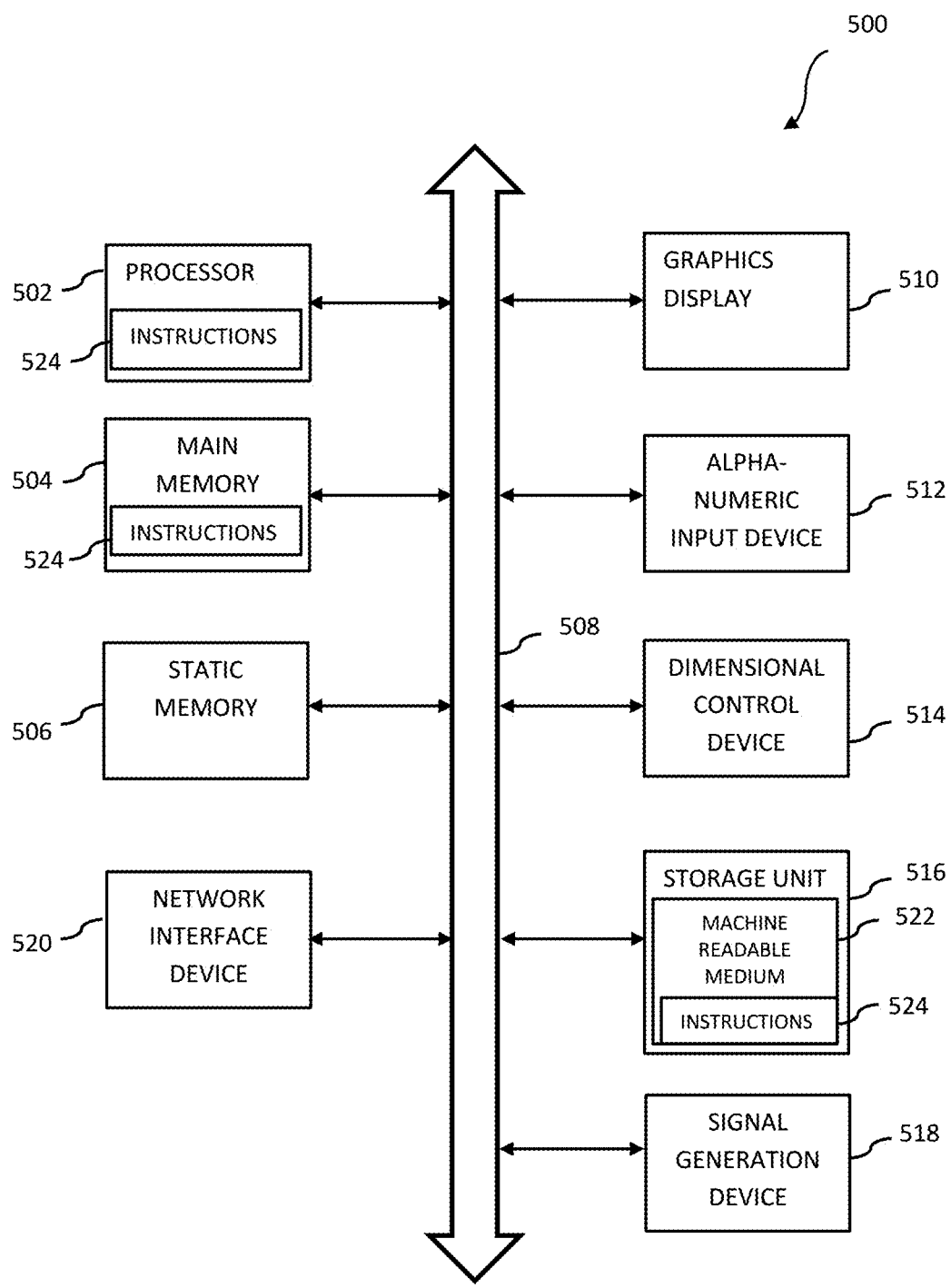
FIG. 5 is a block diagram of an exemplary implementation of a computing device, in accordance with the principles of the present disclosure.

Now referring to FIG. 5, a block diagram illustrating components of an example computing system 500 able to read instructions from a computer-readable medium and execute them in one or more processors (or controllers), is shown. The computing system 500 in FIG. 5 may represent an implementation of, for example, a processing platform in communication with the display and camera apparatus 100 described herein via the data interface 412 (e.g., a user's PC or laptop or a cloud server), or alternatively may be integrated with the display and camera apparatus 100 itself if desired.

For example, the computing system 500 may include a server apparatus that is used to process the captured content and return it to the display and camera apparatus 100 via 5G NR low-latency links.

The computing system 500 may be used to execute instructions 524 (e.g., program code or software) for causing the computing system 500 to perform any one or more of the methodologies (or processes) described herein, including image generation, virtual image generation and motion/perspective compensation, combination of multiple captured images (including for example algorithmic "stitching" (, color correction, removal of background data/features and replacement thereof, removal of undesirable artifacts from generated images (e.g., elimination of data from one sub-array 111 that was covered by the user's finger during data capture), and others. Further, while only a single computer system 500 is illustrated, a plurality of computing systems may operate to jointly execute instructions 524 to perform any one or more of the methodologies discussed herein, such as via a distributed processing architecture.

The example computing system 500 includes one or more processing units (generally processor apparatus 502). The computing system 500 may include a main memory 504. The computing system 500 may include a storage unit 516. The processor 502, memory 504 and the storage unit 516 may communicate via a bus 508. One or more of the storage unit 516, main memory 504, and static memory 506 may be utilized to store, inter alia, media (e.g., image data and/or audio data) and/or the device capture parameters 406.

In addition, the computing system 500 may include a graphics display 510 (e.g., to drive a plasma display panel (PDP), a liquid crystal display (LCD), a projector, or other types of displays). The computing system 500 may also include input/output devices, e.g., an alphanumeric input device 512 (e.g., touch screen-based keypad or an external input device such as a keyboard), a dimensional (e.g., 2-D or 3-D) control device 514 (e.g., a touch screen or external input device such as a mouse, a trackball, a joystick, a motion sensor, or other pointing instrument), a signal capture/generation device 518 (e.g., a speaker, camera, and/or microphone), and a network interface device 520, which also are configured to communicate via the bus 508.

Embodiments of the computing system 500 corresponding to a client device may include a different configuration than an embodiment of the computing system 500 corresponding to a server. For example, an embodiment corresponding to a server may include a larger storage unit 516, more memory 504, and a faster processor 502 but may lack the graphics display 510, input device 512, and dimensional control device 514.

Embodiments of the computing system 500 corresponding to a client device may include a different configuration than an embodiment of the computing system 500 corresponding to a server. For example, an embodiment corresponding to a server may include a larger storage unit 516, more memory 504, and a faster processor 502 but may lack the display driver 510, input device 512, and dimensional control device 514.

The storage unit 516 includes a computer-readable medium 522 on which is stored instructions 524 (e.g., a computer program or software) embodying any one or more of the methodologies or functions described herein. The instructions 524 may also reside, completely or at least partially, within the main memory 504 or within the processor 502 (e.g., within a processor's cache memory) during execution thereof by the computing system 500, the main memory 504 and the processor 502 also constituting computer-readable media. The instructions 524 may be transmitted or received over a network via the network interface device 520.

While computer-readable medium 522 is shown in an example embodiment to be a single medium, the term "computer-readable medium" should be taken to include a single medium or multiple media (e.g., a centralized or distributed database, or associated caches and servers) able to store the instructions 524. The term "computer-readable medium" shall also be taken to include any medium that is capable of storing instructions 524 for execution by the computing system 500 and that cause the computing system 500 to perform, for example, one or more of the methodologies disclosed herein.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

Exemplary Methodologies—

Figure 6:
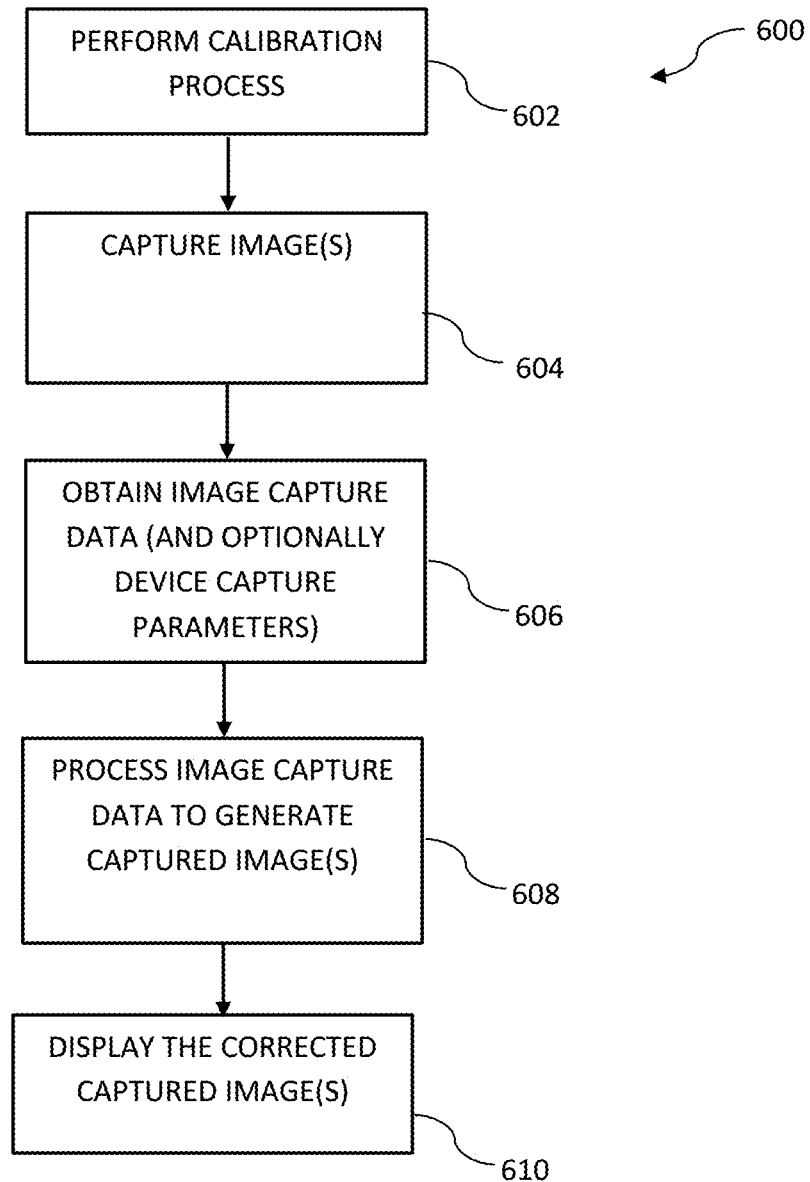
FIG. 6 is a logical flow diagram illustrating one exemplary method for operating a light-field camera and apparatus, in accordance with the principles of the present disclosure.

FIG. 6 illustrates an exemplary methodology 600 for operating a display apparatus, in accordance with the principles of the present disclosure. The method 600 is a generalized method, and is therefore applicable to a wide variety of image types, parameters, and processes. Additionally, the method 600 can be performed by the processing apparatus 404 of FIG. 4, computing device 500 of FIG. 5, and/or by other components or processes such as a cloud server, whether alone or in combination with one another.

At step 602, a calibration process is (optionally) performed. In one embodiment, the calibration process can be that of method 700 of FIG. 7, described below. If a calibration has already been conducted, this step (step 702) can be omitted, as the calibration (e.g., subtraction parameters relating to the portion of display light 318 leaked from the display screen 102 into the incoming light 316 that is passed through microlens(es) 106) would have already been calculated and stored. Alternatively, the calibration process may be omitted entirely in certain implementations, including for example those where the effect of any bleed-over is minimal in the given operational environment or where the camera elements 105 are insulated or isolated from such bleed-over.

At step 604, one or more image(s) are captured. The capture may commence based on an indication by the user (e.g., press of the record button, voice command, camera shake, clap, and/or other indication). In some implementations, the capture may be initiated automatically by the camera based on a given condition (e.g., timer expiration, parameter breaching a threshold (e.g., ambient light reaching a given level during pre-dawn/dawn), arrival of a wireless communication (e.g., text message, ping), and/or other condition). The capture may be configured to acquire images over a certain interval or duration; for example, between 0.1 s and 120 s. In some implementations, the camera may be configured to take a single image (photo) at the specified interval or a plurality of images (e.g., 2-100). Multiple images may be utilized, e.g., when bracketing for exposure and/or focus distance. Duration of the capture may be configured by the user.

In various embodiments, step 604 includes photoreceptor elements 112, 400 capturing incoming light 316 in the form of raw light-field data after the incoming light 316 passes through microlenses 106 (and optionally one or more filters 314). As explained elsewhere herein, in some variants, the initial incoming light 316 received by the photoreceptors 112, 400 will likely include at least a portion of display light 318 that is leaked into the captured image from the display screen 102.

At step 606, the image capture data (and optionally, device capture parameters 406) are obtained. The image capture data can include, for example, the raw light-field data (discussed above in step 604), the device capture parameters 606, etc. The processing apparatus 404 can process the raw light-field data from the light-field photoreceptors 400 to provide an image and light-field parameters, which may include a variety of data regarding the image. The processing apparatus 404 can utilize the device capture parameters 406 in the processing of the raw light-field data, and can provide light-field parameters in addition to the image. As noted elsewhere, the light-field parameters may be the same as the device capture parameters 406, or may be derived from the device capture parameters 406 via the processing component 404.

In some embodiments, the light-field parameters and/or device capture parameters 406 may describe the light-field camera 100.

In some embodiments, the image capture data is obtained by the processing apparatus 404 from the light-field receptors 112, 400 after conversion, by the light-field receptors 112, 400, of the raw light-field data into the image capture data. In other embodiments, the processing apparatus 404 can receive raw light-field data from the light-field receptors 112, 400 and convert the raw light-field data into the image capture data.

At step 608, the image capture data is processed to generate the captured image(s). In various exemplary embodiments of the present disclosure, processing/logic can be used to subtract the display light 318 from value output by each sensor 112, wherein the output value represents the sum of the irradiance of the light 316, 318 that illuminates each sensor element 112. Accordingly, the processing may include utilizing the subtraction parameters to correct the captured image(s); and, in some variants, the subtraction parameters correspond to parameters relating to the portion of display light 318 leaked from the display screen 102 into the incoming light 316 that is passed through microlens(es) 106. These parameters may be obtained during the calibration process performed at step 602 (also see FIG. 7 and the supporting discussion corresponding thereto).

In other embodiments, the subtraction parameters can be obtained utilizing various device capture parameters 406. For example, in some embodiments, the subtraction parameters can be derived from the output values and other parameters of each pixel at the time the capture occurred.

In yet other embodiments, if the image capture data and/or device capture parameters indicate an object was obstructing at least a portion of the display screen, that object can be processed out of the displayed image. This is one advantage of the present disclosure—i.e., due to the different viewpoints of the camera elements 105, and the photosensor elements 112 in the sub-array 111 associated with each camera element 105, parallax can be processed out of the final image that is displayed. For example, in one variant, the processing may include deleting or ignoring the image capture data that indicates no light, as the object (such as a finger would block light from being captured by the photosensors. In other words, due to the different viewpoints of the cameras, if an object is obstructing the light into one or more of the cameras in the array 107 (such as a finger on the screen), data from those cameras 105 can be omitted from the final image that is displayed. Moreover, as described previously, the processing of step 608 can also include virtualization of multiple different perspectives, angles, or stereoscopic presentation, as well as virtual motion.

In yet other embodiments, the processing may include computationally controlling depth of field and focus, and/or removing or changing the background of the image.

Other processing can include utilizing a weighting algorithm—such as, for example, a Gaussian weighting algorithm, a bicubic weighting algorithm, a bilinear weighting algorithm, etc.—in order to calculate a weighted summation of the irradiance of the light 316, 318 that illuminates each sensor element 112. Specifically, the summation may be weighted, such that different irradiances of light 316, 318 contribute different fractions to the sum. Irradiance weights may be assigned, for example, as a function of the location of the intersection between light 316 and the display screen 102, relative to the center of a particular camera element 105 or microlens 106. In some variants, the color associated with display light 318 that leaks into the incoming light 316 can be subtracted from the sum.

Additionally, the processing can include utilizing one or more de-mosaicing algorithms to interpolate a set of complete red, green, and blue values for each sensor element 112, if color filters (such as a Bayer filter) is used. More pointedly, utilizing the filter pattern (e.g., Bayer filter) enables the capture of image data in multiple color channels from the reference viewpoint. Such image data can be used to determine pixel similarity. For example, the depth and visibility of pixels in one channel can be compared to the depth and visibility of pixels in one or more other color channels. To obtain a full-color image the pattern must be converted to full-color pixels. For this conversion, various de-mosaicing algorithms can be used to interpolate a set of complete red, green, and blue values for each sensor element 112. These algorithms make use of the surrounding sensors of the corresponding colors to estimate the values for a particular sensor. Such conversion can take place prior to the display of the image(s), so that the displayed image(s) can be reconstructed without differentiation. In alternative variants, separate reconstruction can be performed for each color channel.

At step 610, the corrected captured image(s) are processed as needed for rendering, and displayed.

Figure 7:
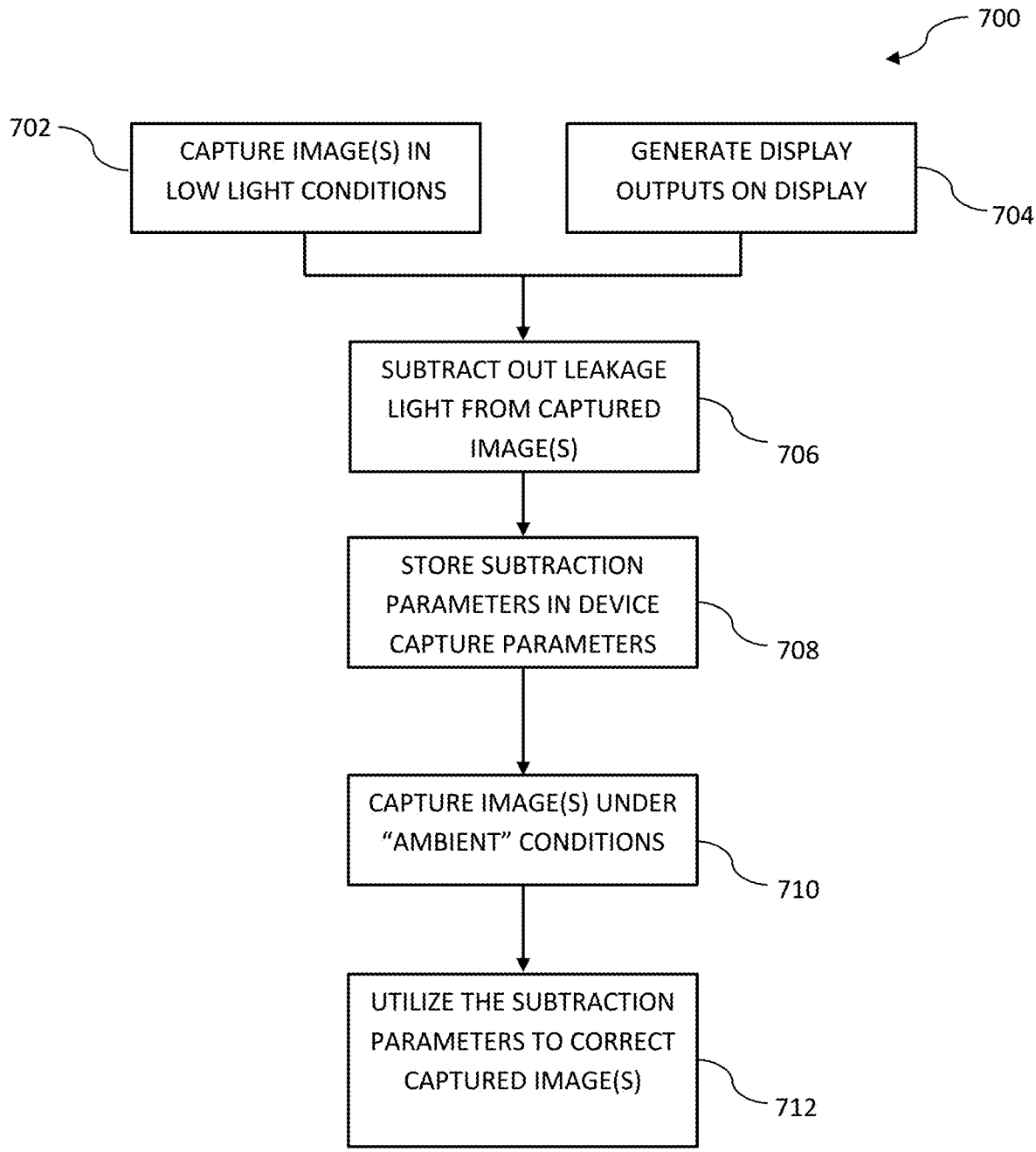
FIG. 7 is a logical flow diagram illustrating one exemplary method for calibrating a light-field camera and apparatus, in accordance with the principles of the present disclosure.

Now referring to FIG. 7, an exemplary methodology 700 for calibrating a camera and display apparatus, in accordance with the principles of the present disclosure, is shown.

The calibration process 700 starts in one embodiment with both steps 602 and 704 being performed contemporaneously or at least substantially contemporaneously. At step 702, image data is captured in the prescribed test conditions (e.g., low-light conditions). According to the present disclosure, "low-light" conditions include dark or substantially dark conditions, where at least the majority of the light captured is light emitted from the display screen of the display apparatus per step 704. For example, a user of the display apparatus could turn off the lights in a room with no windows, or covered windows, when step 702 is performed.

At step 704, display outputs are generated on the display. That is, the display generates light or various degrees of light to be captured in the image(s) per step 702. Accordingly, step 704 occurs contemporaneously or substantially contemporaneously with step 702. In various embodiments of the present disclosure, step 704 may include displaying one or more images that reflect various degrees of light, such that an image is captured per step 702 for each image and/or degree of light displayed.

In some variants, a uniform test "pattern" is utilized for the display by the non-camera pixels 104; e.g., activation of each pixel on the display, to a prescribed intensity or output level. In other variants, only portions of the display are subjected to display generation (e.g., those associated with a given camera element or portion of the display 103 under test/calibration). In yet other variants, only portions of the pixels of the display 102 are activated using a test pattern that alternates with respect to a given camera element 105 or camera portion 103, such as where (i) pixels immediately proximate to a given camera element 105 are first activated, then (ii) pixels within the same portion but not immediately proximate the camera element 105 under test are activated, followed by (iii) activation of pixels in other portions 103 or non-camera portions of the display are activated (in effect, going from most severe to least severe in terms of impact on the camera element under test).

It will also be appreciated that different combinations of camera elements 105 may be tested/calibrated at any given time. For instance, the foregoing variant describes test of a single camera element 105 ("DUT"); however, two or more DUTs can be evaluated simultaneously or in sequence, as can different subsets or combinations of camera elements 105 (or even specific subsets of photosensitive elements 112 across one or more sub-arrays 111).

In some implementations, the captured image(s) per step 702 and/or display outputs per step 704, or data representative thereof, may be stored in storage device of FIG. 4, and/or by other components, including any known in the art.

At step 706, the leakage light is subtracted from the captured image(s). In other words, the light that was generated from the display per step 704 and which leaked into the image(s) captured per step 702—is identified and quantified into one or more parameters (referred hereinto as "subtraction parameters"). The photosensors 112, 400 may capture the leakage light and then convert the leakage light into data or signals. At step 708, the one or more subtraction parameters are stored for later use. In various exemplary embodiments of the present disclosure, the subtraction parameters are stored in the device capture parameters 406 of FIG. 4. However, the parameters may be stored in any known type of file or storage system. In some implementations, the parameters may be stored as metadata of the image(s) captured per step 702.

At step 710, one or more images are captured under ambient conditions. Such ambient conditions may range from normal lighting, bright sunlight, etc. The stored subtraction parameters are then utilized to correct the image(s) captured under ambient conditions per step 712.

For example, the image(s) captured per step 710, or data representative thereof, can be retrieved directly from photosensors 112, 400 or from one or more other components of the memory 402. The image(s) captured per step 710, or data representative thereof, can then be processed by the light-field analysis logic 408; hence, the image(s) captured per step 710 may optionally represent a new or refocused image and/or view generated from the subtraction parameters. As previously alluded to, the subtraction parameters may also be retrieved from the memory 402; and in particular, device capture parameters 406.

The light-field analysis logic 408 may engage in a variety of calculations, comparisons, and the like using the subtraction parameters, and optionally a variety of data regarding the image(s) captured at step 710 and step 702, to determine the most appropriate correction to be applied to the process at step 712. For example, the light-field analysis logic 408 may simply utilize the subtraction parameters to account for or subtract the leakage light obtained at step 706. Further, the light-field analysis logic 408 may utilize other data such as whether a portion of the photosensors 112, 400 were blocked (perhaps by a finger of the user) and therefore, the image data from the unblocked photosensors 112, 400 would need to be utilized to form a complete image.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice versa, unless explicitly stated otherwise herein.

Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed is:

1. A computerized method of forming an image from a plurality of constituents, comprising:
receiving at least a portion of output data relating to at least a portion of light at each of captured at a plurality of camera elements distributed throughout a display area of a display, the at least the portion of the light associated with a subject from which the at least the portion of the light originates, wherein the at least the portion of the light captured at the plurality of camera elements includes light leakage from one or more pixels of the display;
determining the light leakage from the one or more pixels of the display in a capture of the light at the plurality of camera elements; and
causing generation of one or more images based on subtraction of the light leakage from the one or more pixels of the display in the capture of the light at the plurality of camera elements from the at least the portion of the output data relating to the at least the portion of the light captured at the plurality of camera elements.

2. The computerized method of claim 1, further comprising:
using a first subset of the plurality of camera elements to obtain a first image; and
using a second subset of the plurality of camera elements to obtain a second image having a spatially different perspective from the first image.

3. The computerized method of claim 1, wherein said generation of the one or more the images comprises: using a weighting algorithm to combine image data from the plurality of camera elements.

4. The computerized method of claim 1, wherein said generation of the one or more the images comprises: using one or more de-mosaicing algorithms to interpolate a set of color values for each of the plurality of camera elements.

5. Computer readable apparatus comprising a non-transitory storage medium, the non-transitory storage medium comprising at least one computer program having a plurality of instructions, the plurality of instructions configured to, when executed on a processing apparatus, cause the processing apparatus to:
receive data relating to at least a portion of light captured at plurality of camera elements distributed throughout a display area of a display, wherein the at least the portion of the light captured at the plurality of camera elements includes light leakage from one or more pixels of the display;
determine the light leakage from the one or more pixels of the display in a capture of the light at the plurality of camera elements; and
cause generation of one or more images based on subtraction of the light leakage from the one or more pixels of the display in the capture of the light at the plurality of camera elements from at least the data relating to the at least the portion of the light captured at the plurality of camera elements.

6. The computer readable apparatus of claim 5, wherein:
the receipt of the data relating to the at least portion of light captured at the plurality of camera elements comprises receipt of first image data captured at a first resolution;
a causation of the generation of the one or more images comprises an algorithmic combination of the first image data to generate the one or more images, the one or more images having a second resolution that is greater than the first resolution.

7. The computer readable apparatus of claim 5, wherein the generation of the one or more images comprises utilization of a weighting algorithm to calculate a weighted summation of a plurality of colors of an irradiance of light that illuminates the plurality of camera elements.

8. The computer readable apparatus of claim 5, wherein the generation of the one or more images comprises utilization of one or more demosaicing algorithms to interpolate a set of color values for the plurality of camera elements.

9. Computerized apparatus configured to form an image, the computerized apparatus comprising:
a display including a plurality of camera elements distributed throughout a display area of the display, the plurality of camera elements configured to capture incoming light and generate output data related thereto; and
a digital processor in data communication with the plurality of camera elements and configured to:
receive at least a portion of the output data relating to at least a portion of the incoming light captured at respective ones of the plurality of camera elements, wherein the at least the portion of the incoming light captured at the respective ones of the plurality of camera elements includes light leakage from one or more pixels of the display;
determine the light leakage from the one or more pixels of the display in a capture of the incoming light at the respective ones of the plurality of camera elements; and
cause generation of one or more images based on subtraction of the light leakage from the one or more pixels of the display in the capture of the incoming light at the respective ones of the plurality of camera elements from the at least the portion of the output data relating to the at least the portion of the incoming light captured at the respective ones of the plurality of camera elements.

10. The computerized apparatus of claim 9, wherein the one or more images are of higher resolution than an image which can be obtained from individual ones of the plurality of camera elements.

11. The computerized method of claim 1, wherein the plurality of camera elements distributed throughout the display area of the display includes pinholes or microlens of the plurality of camera elements positioned adjacent to groups of color pixels in the display.

12. The computerized method of claim 1, wherein the plurality of camera elements distributed throughout the display area of the display includes pinholes or microlens of the plurality of camera elements replace one of color pixels in groups of color pixels in the display.

13. The computerized method of claim 12, wherein the pinholes or the microlens of the plurality of camera elements replace more of blue pixels than green pixels or red pixels in the groups of color pixels in the display.

14. The computer readable apparatus of claim 5, wherein the plurality of camera elements distributed throughout the display area of the display includes pinholes or microlens of the plurality of camera elements positioned adjacent to groups of color pixels in the display.

15. The computer readable apparatus of claim 5, wherein the plurality of camera elements distributed throughout the display area of the display includes pinholes or microlens of the plurality of camera elements replace one of color pixels in groups of color pixels in the display.

16. The computer readable apparatus of claim 15, wherein the pinholes or the microlens of the plurality of camera elements replace more of blue pixels than green pixels or red pixels in the groups of color pixels in the display.

17. The computerized apparatus of claim 9, wherein the plurality of camera elements distributed throughout the display area of the display includes pinholes or microlens of the plurality of camera elements positioned adjacent to groups of color pixels in the display.

18. The computerized apparatus of claim 9, wherein the plurality of camera elements distributed throughout the display area of the display includes pinholes or microlens of the plurality of camera elements replace one of color pixels in groups of color pixels in the display.

19. The computerized apparatus of claim 18, wherein the pinholes or the microlens of the plurality of camera elements replace more of blue pixels than green pixels or red pixels in the groups of color pixels in the display.

* * * * *